United States Patent
Hu et al.

(10) Patent No.: US 11,877,150 B2
(45) Date of Patent: Jan. 16, 2024

(54) INFORMATION OBTAINING METHOD AND APPARATUS

(71) Applicant: HUAWEI TECHNOLOGIES CO., LTD., Guangdong (CN)

(72) Inventors: Li Hu, Shanghai (CN); He Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 93 days.

(21) Appl. No.: 17/511,680

(22) Filed: Oct. 27, 2021

(65) Prior Publication Data

US 2022/0053325 A1 Feb. 17, 2022

Related U.S. Application Data

(63) Continuation of application No. PCT/CN2020/087333, filed on Apr. 27, 2020.

(30) Foreign Application Priority Data

Apr. 28, 2019 (CN) .......................... 201910351470.5

(51) Int. Cl.
*H04W 12/0431* (2021.01)
*H04W 12/106* (2021.01)
(Continued)

(52) U.S. Cl.
CPC ......... *H04W 12/0431* (2021.01); *H04W 8/12* (2013.01); *H04W 12/033* (2021.01); *H04W 12/106* (2021.01)

(58) Field of Classification Search
CPC ... H04W 12/041; H04W 12/03; H04W 12/04; H04W 12/0431; H04W 12/106;
(Continued)

(56) References Cited

U.S. PATENT DOCUMENTS

| 8,924,722 B2 * | 12/2014 | Horn | H04L 63/062 |
| | | | 713/168 |
| 10,321,309 B2 * | 6/2019 | Lee | H04W 12/06 |

(Continued)

FOREIGN PATENT DOCUMENTS

| CN | 109005540 A | 12/2018 |
| CN | 109246696 A | 1/2019 |

(Continued)

OTHER PUBLICATIONS

3GPP TS 33.501 V15.4.0 (Mar. 2019), 3rd Generation Partnership Project; Technical Specification Group Services and System Aspects; Security architecture and procedures for 5G system(Release 15), 187 pages.

(Continued)

*Primary Examiner* — Lizbeth Torres-Diaz

(57) ABSTRACT

An information obtaining method and an apparatus are disclosed. The method includes: sending a first initial NAS message including a non-cleartext information element protected using a first root key from a terminal to a source mobility management network element; receiving a second root key and first indication information from the source mobility management network element, where the first indication information indicates that the second root key is an updated key; sending second indication information and third indication information to the terminal based on the first indication information, where the second indication information indicates the terminal to update the first root key stored by the terminal to obtain the second root key, and the third indication information indicates the terminal to resend the initial NAS message; and receiving a second initial NAS message including the non-cleartext information element protected using the second root key from the terminal.

19 Claims, 7 Drawing Sheets

(51) Int. Cl.
*H04W 12/033* (2021.01)
*H04W 8/12* (2009.01)

(58) Field of Classification Search
CPC . H04W 8/12; H04W 12/0433; H04W 12/033; H04W 12/0471; H04L 63/062; H04L 2209/80; H04L 61/00; H04L 9/08
USPC .............................................. 726/2; 380/284
See application file for complete search history.

(56) References Cited

U.S. PATENT DOCUMENTS

| | | | | |
|---|---|---|---|---|
| 11,678,192 | B2* | 6/2023 | Watfa | H04W 76/50 455/410 |
| 2015/0334560 | A1* | 11/2015 | Zhang | H04W 12/0433 380/284 |
| 2018/0376394 | A1 | 12/2018 | Hahn et al. | |
| 2019/0281649 | A1* | 9/2019 | Moisanen | H04W 80/10 |
| 2020/0236554 | A1* | 7/2020 | Lee | H04W 12/121 |
| 2020/0359202 | A1* | 11/2020 | Pan | H04L 61/00 |
| 2021/0195563 | A1* | 6/2021 | Lee | H04W 12/041 |
| 2022/0174483 | A1* | 6/2022 | Tiwari | H04W 48/18 |

FOREIGN PATENT DOCUMENTS

| | | | | |
|---|---|---|---|---|
| CN | 109587685 A | 4/2019 | | |
| WO | 2018137866 A1 | 8/2018 | | |
| WO | 2018138348 A1 | 8/2018 | | |
| WO | WO-2018138348 A1 * | 8/2018 | ........... | H04L 63/062 |
| WO | 2018227431 A1 | 12/2018 | | |
| WO | WO-2018227431 A1 * | 12/2018 | | |

OTHER PUBLICATIONS

Zte et al: "Key hierarchy when using UP security function", 3GPP Draft; S3-171054, May 8, 2017, XP051269086, total 9 pages.
Extended European Search Report issued in EP20798380.0, dated Apr. 13, 2022, 9 pages.
Ericsson, Security context management during AMF change, 3GPP TSG-SA WG3 Meeting #86, Sophia Antipolis, France, Feb. 6-10, 2017, S3-170274, 3 pages.
Office Action issued in CN201910351470.5, dated May 6, 2021, 14 pages.
International Search Report and Written Opinion issued in PCT/CN2020/087333, dated Jul. 29, 2020, 11 pages.

* cited by examiner

INFORMATION OBTAINING METHOD AND APPARATUS

CROSS-REFERENCE TO RELATED APPLICATIONS

This application is a continuation of International Application No. PCT/CN2020/087333, filed on Apr. 27, 2020, which claims priority to Chinese Patent Application No. 201910351470.5, filed on Apr. 28, 2019. The disclosures of the aforementioned applications are hereby incorporated by reference in their entireties.

TECHNICAL FIELD

This application relates to the field of communication technologies, and in particular, to an information obtaining method and an apparatus.

BACKGROUND

A security protection mechanism is introduced into a mobile communication network defined by the 3rd generation partnership project (3GPP) to ensure security of mobile communication, including confidentiality and integrity of communication. For example, in a 5th generation (5G) network, a partly ciphering mechanism for an initial non-access stratum (NAS) message is introduced, that is, a part of information elements in the initial NAS message are encrypted, so that the information elements in the initial NAS message are protected as much as possible.

Because the partly ciphering mechanism is introduced, after a terminal is handed over from a source access and mobility management function (AMF) to a target AMF, because the source AMF may update a root key in a security context, a security context obtained by the target AMF from the source AMF is inconsistent with a security context used by the terminal, and the target AMF cannot decrypt the initial NAS message previously sent by the terminal. In this case, the target AMF needs to initiate an authentication procedure, to help update a security context between the target AMF and the terminal. After the security context is updated, the terminal resends an initial NAS message to the target AMF, so that the target AMF can decrypt the initial NAS message based on an updated security context, to obtain a non-cleartext information element in the initial NAS message. However, in the authentication procedure, a plurality of pieces of signaling need to be exchanged between the target AMF and the terminal, resulting in relatively high signaling overheads.

SUMMARY

This application provides an information obtaining method and an apparatus, so that in a scenario in which a source mobility management network element updates a root key in a security context, a target mobility management network element may obtain a non-cleartext information element in an initial NAS message with relatively low signaling overheads.

According to a first aspect, an information obtaining method is provided. The method includes: A target mobility management network element sends, to a source mobility management network element, a first initial non-access stratum (NAS) message from a terminal, where the first initial NAS message includes a non-cleartext information element that is security protected by using a first root key. The target mobility management network element receives a second root key and first indication information that are sent by the source mobility management network element, where the first indication information is used to indicate that the second root key is a root key obtained by updating the first root key. The target mobility management network element sends second indication information and third indication information to the terminal based on the first indication information, where the second indication information is used to indicate the terminal to update the first root key stored by the terminal to obtain the second root key, and the third indication information is used to indicate the terminal to resend an initial NAS message. The target mobility management network element receives a second initial NAS message sent by the terminal, where the second initial NAS message includes the non-cleartext information element that is security protected by using the second root key.

Based on this technical solution, the target mobility management network element determines, based on the first indication information from the source mobility management network element, that the first root key has been updated to the second root key. In this case, the target mobility management network element sends the second indication information to the terminal based on the first indication information, so that the terminal can update the first root key to the second root key. This ensures that root keys stored by the target mobility management network element and the terminal are the same. In addition, the target mobility management network element further sends the third indication information to the terminal, to obtain the second initial NAS message sent by the terminal. Because the second initial NAS message includes the non-cleartext information element that is security protected by using the second root key, and the target mobility management network element has obtained the second root key from the source mobility management network element, the target mobility management network element can decrypt the non-cleartext information element that is security protected in the second initial NAS message, to obtain the non-cleartext information element. Compared with a current technology, the target mobility management network element does not need to initiate an authentication procedure. This helps reduce signaling overheads and saves time consumed for the authentication procedure.

In a possible design, after the target mobility management network element receives the second root key and the first indication information that are sent by the source mobility management network element, the method further includes: The target mobility management network element decrypts, based on the second root key, the non-cleartext information element that is security protected in the first initial NAS message. That the target mobility management network element sends the second indication information and the third indication information to the terminal based on the first indication information includes: When the target mobility management network element fails to decrypt the non-cleartext information element that is security protected in the first initial NAS message, the target mobility management network element skips an authentication procedure and sends the second indication information and the third indication information to the terminal based on the first indication information. It may be understood that skipping the authentication procedure helps reduce signaling overheads.

In a possible design, that the target mobility management network element sends the second indication information and the third indication information to the terminal based on the first indication information includes: The target mobility management network element skips an authentication procedure and sends the second indication information and the third indication information to the terminal based on the first indication information. It may be understood that skipping the authentication procedure helps reduce signaling overheads. In addition, the non-cleartext information element that is security protected in the first initial NAS message does not need to be decrypted by using the second root key. This helps save time consumed for a decryption procedure.

In a possible design, the second initial NAS message is included in a NAS security mode complete (SMP) message or a registration complete message.

In a possible design, the second indication information and the third indication information are included in a NAS security mode command (SMC) message.

In a possible design, that the target mobility management network element sends, to the source mobility management network element, the first initial NAS message from the terminal includes: The target mobility management network element sends a context request message to the source mobility management network element, where the context request message includes the first initial NAS message. That the target mobility management network element receives the second root key and the first indication information that are sent by the source mobility management network element includes: The target mobility management network element receives a context response message sent by the source mobility management network element, where the context response message includes the second root key and the first indication information.

According to a second aspect, an information obtaining method is provided. The method includes: A target mobility management network element sends, to a source mobility management network element, a first initial non-access stratum (NAS) message from a terminal, where the first initial NAS message includes a non-cleartext information element that is security protected by using a first root key. The target mobility management network element receives a second root key and first indication information that are sent by the source mobility management network element, where the first indication information is used to indicate that the second root key is a root key obtained by updating the first root key. The target mobility management network element sends second indication information and fourth indication information to the terminal based on the first indication information, where the second indication information is used to indicate the terminal to update the first root key stored by the terminal to obtain the second root key, and the fourth indication information is used to indicate the terminal to resend the non-cleartext information element. The target mobility management network element receives a second initial NAS message sent by the terminal, where the second initial NAS message includes the non-cleartext information element that is security protected by using the second root key.

Based on this technical solution, the target mobility management network element determines, based on the first indication information from the source mobility management network element, that the first root key has been updated to the second root key. In this case, the target mobility management network element sends the second indication information to the terminal based on the first indication information, so that the terminal can update the first root key to the second root key. This ensures that root keys stored by the target mobility management network element and the terminal are the same. In addition, the target mobility management network element further sends the fourth indication information to the terminal, to obtain the non-cleartext information element that is sent by the terminal and that is security protected by using the second root key. Because the target mobility management network element has obtained the second root key from the source mobility management network element, the target mobility management network element can decrypt the non-cleartext information element that is security protected by using the second root key, to obtain the non-cleartext information element. Compared with a current technology, the target mobility management network element does not need to initiate an authentication procedure. This helps reduce signaling overheads and saves time consumed for the authentication procedure.

In a possible design, after the target mobility management network element receives the second root key and the first indication information that are sent by the source mobility management network element, the method further includes: The target mobility management network element decrypts, based on the second root key, the non-cleartext information element that is security protected in the first initial NAS message. That the target mobility management network element sends the second indication information and the third indication information to the terminal based on the first indication information includes: When the target mobility management network element fails to decrypt the non-cleartext information element that is security protected in the first initial NAS message, the target mobility management network element skips an authentication procedure and sends the second indication information and the third indication information to the terminal based on the first indication information. It may be understood that skipping the authentication procedure helps reduce signaling overheads.

In a possible design, that the target mobility management network element sends the second indication information and the third indication information to the terminal based on the first indication information includes: The target mobility management network element skips an authentication procedure and sends the second indication information and the third indication information to the terminal based on the first indication information. It may be understood that skipping the authentication procedure helps reduce signaling overheads. In addition, the non-cleartext information element that is security protected in the first initial NAS message does not need to be decrypted by using the second root key. This helps save time consumed for a decryption procedure.

In a possible design, the second initial NAS message is included in a NAS SMP message or a registration complete message.

In a possible design, the second indication information and the fourth indication information are included in a NAS SMC message.

In a possible design, that the target mobility management network element sends, to the source mobility management network element, the first initial NAS message from the terminal includes: The target mobility management network element sends a context request message to the source mobility management network element, where the context request message includes the first initial NAS message. That the target mobility management network element receives the second root key and the first indication information that are sent by the source mobility management network element includes: The target mobility management network element receives a context response message sent by the source mobility management network element, where the context response message includes the second root key and the first indication information.

According to a third aspect, an information obtaining method is provided. The method includes: A target mobility management network element sends, to a source mobility management network element, a first initial non-access stratum (NAS) message from a terminal, where the first initial NAS message includes a non-cleartext information element that is security protected by using a first root key. The target mobility management network element receives a second root key, first indication information, and the non-cleartext information element that are sent by the source mobility management network element, where the first indication information is used to indicate that the second root key is a root key obtained by updating the first root key. The target mobility management network element sends second indication information and fourth indication information to the terminal based on a preset rule and the first indication information, where the second indication information is used to indicate the terminal to update the first root key stored by the terminal to obtain the second root key, and the fourth indication information is used to indicate the terminal to resend the non-cleartext information element. The target mobility management network element receives the non-cleartext information element that is sent by the terminal and that is security protected by using the second root key.

Based on this technical solution, the target mobility management network element determines, based on the first indication information from the source mobility management network element, that the first root key has been updated to the second root key. In this case, the target mobility management network element sends the second indication information to the terminal based on the first indication information, so that the terminal can update the first root key to the second root key. This ensures that root keys stored by the target mobility management network element and the terminal are the same. In addition, the target mobility management network element further sends the fourth indication information to the terminal, to obtain the non-cleartext information element that is sent by the terminal and that is security protected by using the second root key. Because the target mobility management network element has obtained the second root key from the source mobility management network element, the target mobility management network element can decrypt the non-cleartext information element that is security protected by using the second root key, to obtain the non-cleartext information element. Compared with a current technology, the target mobility management network element does not need to initiate an authentication procedure. This helps reduce signaling overheads and saves time consumed for the authentication procedure.

In a possible design, the preset rule includes: when the source mobility management network element is not trustworthy, the target mobility management network element re-obtains the non-cleartext information element from the terminal. It may be understood that, when the source mobility management network element is not trustworthy, the non-cleartext information element sent by the source mobility management network element may be tampered with. In this way, the target mobility management network element needs to re-obtain the non-cleartext information element, to ensure security of a communication network.

In a possible design, that the target mobility management network element sends the second indication information and the fourth indication information to the terminal based on the preset rule and the first indication information includes: The target mobility management network element determines whether the source mobility management network element is trustworthy; and the target mobility management network element sends the second indication information and the fourth indication information to the terminal based on the first indication information if the source mobility management network element is not trustworthy.

In a possible design, that the target mobility management network element determines whether the source mobility management network element is trustworthy has at least one of the following cases: (1) If the target mobility management network element determines that all mobility management network elements are trustworthy, the target mobility management network element determines that the source mobility management network element is trustworthy. (2) If the target mobility management network element determines that none of mobility management network elements is trustworthy, the target mobility management network element determines that the source mobility management network element is not trustworthy. (3) If the source mobility management network element is in a whitelist, the target mobility management network element determines that the source mobility management network element is trustworthy, where the whitelist includes at least one mobility management network element. (4) If the source mobility management network element is in a blacklist, the target mobility management network element determines that the source mobility management network element is not trustworthy, where the blacklist includes at least one mobility management network element.

In a possible design, that the target mobility management network element sends the second indication information and the fourth indication information to the terminal based on the first indication information if the source mobility management network element is not trustworthy includes: The target mobility management network element skips an authentication procedure and sends the second indication information and the fourth indication information to the terminal based on the first indication information if the source mobility management network element is not trustworthy.

In a possible design, the non-cleartext information element that is security protected by using the second root key is included in a NAS SMP message or a registration complete message.

In a possible design, the second indication information and the fourth indication information are included in a NAS SMC message.

In a possible design, that the target mobility management network element sends, to the source mobility management network element, the first initial NAS message from the terminal includes: The target mobility management network element sends a context request message to the source mobility management network element, where the context request message includes the first initial NAS message. That the target mobility management network element receives the second root key, the first indication information, and the non-cleartext information element that are sent by the source mobility management network element includes: The target mobility management network element receives a context response message sent by the source mobility management network element, where the context response message includes the second root key, the first indication information, and the non-cleartext information element.

According to a fourth aspect, an information obtaining method is provided. The method includes: A target mobility management network element sends, to a source mobility management network element, a first initial non-access stratum (NAS) message from a terminal, where the first initial NAS message includes a non-cleartext information element that is security protected by using a first root key. The target mobility management network element receives a second root key, first indication information, and the non-cleartext information element that are sent by the source mobility management network element, where the first indication information is used to indicate that the second root key is a root key obtained by updating the first root key. The target mobility management network element sends second indication information and third indication information to the terminal based on a preset rule and the first indication information, where the second indication information is used to indicate the terminal to update the first root key stored by the terminal to obtain the second root key, and the third indication information is used to indicate the terminal to resend an initial NAS message. The target mobility management network element receives a second initial NAS message sent by the terminal, where the second initial NAS message includes the non-cleartext information element that is security protected by using the second root key.

Based on this technical solution, the target mobility management network element determines, based on the first indication information from the source mobility management network element, that the first root key has been updated to the second root key. In this case, the target mobility management network element sends the second indication information to the terminal based on the first indication information, so that the terminal can update the first root key to the second root key. This ensures that root keys stored by the target mobility management network element and the terminal are the same. In addition, the target mobility management network element further sends the third indication information to the terminal, to obtain the second initial NAS message sent by the terminal. Because the second initial NAS message includes the non-cleartext information element that is security protected by using the second root key, and the target mobility management network element has obtained the second root key from the source mobility management network element, the target mobility management network element can decrypt the non-cleartext information element that is security protected in the second initial NAS message, to obtain the non-cleartext information element. Compared with a current technology, the target mobility management network element does not need to initiate an authentication procedure. This helps reduce signaling overheads and saves time consumed for the authentication procedure.

In a possible design, the preset rule includes: when the source mobility management network element is not trustworthy, the target mobility management network element re-obtains the non-cleartext information element from the terminal. It may be understood that, when the source mobility management network element is not trustworthy, the non-cleartext information element sent by the source mobility management network element may be tampered with. In this way, the target mobility management network element needs to re-obtain the non-cleartext information element, to ensure security of a communication network.

In a possible design, that the target mobility management network element sends the second indication information and the third indication information to the terminal based on the preset rule and the first indication information includes: The target mobility management network element determines whether the source mobility management network element is trustworthy; and the target mobility management network element sends the second indication information and the third indication information to the terminal based on the first indication information if the source mobility management network element is not trustworthy.

In a possible design, that the target mobility management network element determines whether the source mobility management network element is trustworthy has at least one of the following cases: (1) If the target mobility management network element determines that all mobility management network elements are trustworthy, the target mobility management network element determines that the source mobility management network element is trustworthy. (2) If the target mobility management network element determines that none of mobility management network elements is trustworthy, the target mobility management network element determines that the source mobility management network element is not trustworthy. (3) If the source mobility management network element is in a whitelist, the target mobility management network element determines that the source mobility management network element is trustworthy, where the whitelist includes at least one mobility management network element. (4) If the source mobility management network element is in a blacklist, the target mobility management network element determines that the source mobility management network element is not trustworthy, where the blacklist includes at least one mobility management network element.

In a possible design, that the target mobility management network element sends the second indication information and the third indication information to the terminal based on the first indication information if the source mobility management network element is not trustworthy includes: The target mobility management network element skips an authentication procedure and sends the second indication information and the third indication information to the terminal based on the first indication information if the source mobility management network element is not trustworthy. It may be understood that skipping the authentication procedure helps reduce signaling overheads.

In a possible design, the non-cleartext information element that is security protected by using the second root key is included in a NAS SMP message or a registration complete message.

In a possible design, the second indication information and the third indication information are included in a NAS SMC message.

In a possible design, that the target mobility management network element sends, to the source mobility management network element, the first initial NAS message from the terminal includes: The target mobility management network element sends a context request message to the source mobility management network element, where the context request message includes the first initial NAS message. That the target mobility management network element receives the second root key, the first indication information, and the non-cleartext information element that are sent by the source mobility management network element includes: The target mobility management network element receives a context response message sent by the source mobility management network element, where the context response message includes the second root key, the first indication information, and the non-cleartext information element.

According to a fifth aspect, a communication apparatus is provided. The apparatus includes: a sending module, configured to send, to a source mobility management network element, a first initial non-access stratum (NAS) message from a terminal, where the first initial NAS message includes a non-cleartext information element that is security protected by using a first root key; and a receiving module, configured to receive a second root key and first indication information that are sent by the source mobility management network element, where the first indication information is used to indicate that the second root key is a root key obtained by updating the first root key, where the sending module is further configured to send second indication information and third indication information to the terminal based on the first indication information, where the second indication information is used to indicate the terminal to update the first root key stored by the terminal to obtain the second root key, and the third indication information is used to indicate the terminal to resend an initial NAS message; and the receiving module is further configured to receive a second initial NAS message sent by the terminal, where the second initial NAS message includes the non-cleartext information element that is security protected by using the second root key.

In a possible design, the communication apparatus further includes a processing module. The processing module is configured to: after the receiving module receives the second root key and the first indication information, decrypt, based on the second root key, the non-cleartext information element that is security protected in the first initial NAS message. The sending module is further configured to: when the processing module fails to decrypt the non-cleartext information element that is security protected in the first initial NAS message, skip an authentication procedure and send the second indication information and the third indication information to the terminal based on the first indication information.

In a possible design, the sending module is further configured to: skip an authentication procedure and send the second indication information and the third indication information to the terminal based on the first indication information.

In a possible design, the second initial NAS message is included in a NAS SMP message or a registration complete message.

In a possible design, the second indication information and the third indication information are included in a NAS SMC message.

In a possible design, the sending module is further configured to send a context request message to the source mobility management network element, where the context request message includes the first initial NAS message; and the receiving module is further configured to receive a context response message sent by the source mobility management network element, where the context response message includes the second root key and the first indication information.

According to a sixth aspect, a communication apparatus is provided. The apparatus includes: a sending module, configured to send, to a source mobility management network element, a first initial non-access stratum (NAS) message from a terminal, where the first initial NAS message includes a non-cleartext information element that is security protected by using a first root key; and a receiving module, configured to receive a second root key and first indication information that are sent by the source mobility management network element, where the first indication information is used to indicate that the second root key is a root key obtained by updating the first root key, where the sending module is further configured to send second indication information and fourth indication information to the terminal based on the first indication information, where the second indication information is used to indicate the terminal to update the first root key stored by the terminal to obtain the second root key, and the fourth indication information is used to indicate the terminal to resend the non-cleartext information element; and the receiving module is further configured to receive a second initial NAS message sent by the terminal, where the second initial NAS message includes the non-cleartext information element that is security protected by using the second root key.

In a possible design, the communication apparatus further includes a processing module. The processing module is configured to: after the receiving module receives the second root key and the first indication information that are sent by the source mobility management network element, decrypt, based on the second root key, the non-cleartext information element that is security protected in the first initial NAS message. The sending module is further configured to: when the processing module fails to decrypt the non-cleartext information element that is security protected in the first initial NAS message, skip an authentication procedure and send the second indication information and the third indication information to the terminal based on the first indication information.

In a possible design, the sending module is further configured to: skip an authentication procedure and send the second indication information and the third indication information to the terminal based on the first indication information.

In a possible design, the second initial NAS message is included in a NAS SMP message or a registration complete message.

In a possible design, the second indication information and the fourth indication information are included in a NAS SMC message.

In a possible design, the sending module is further configured to send a context request message to the source mobility management network element, where the context request message includes the first initial NAS message; and the receiving module is further configured to receive a context response message sent by the source mobility management network element, where the context response message includes the second root key and the first indication information.

According to a seventh aspect, a communication apparatus is provided. The apparatus includes: a sending module, configured to send, to a source mobility management network element, a first initial non-access stratum (NAS) message from a terminal, where the first initial NAS message includes a non-cleartext information element that is security protected by using a first root key; and a receiving module, configured to receive a second root key, first indication information, and the non-cleartext information element that are sent by the source mobility management network element, where the first indication information is used to indicate that the second root key is a root key obtained by updating the first root key, where the sending module is further configured to send second indication information and fourth indication information to the terminal based on a preset rule and the first indication information, where the second indication information is used to indicate the terminal to update the first root key stored by the terminal to obtain the second root key, and the fourth indication information is used to indicate the terminal to resend the non-cleartext information element; and the receiving module is further configured to receive the non-cleartext information element that is sent by the terminal and that is security protected by using the second root key.

In a possible design, the preset rule includes: when the source mobility management network element is not trustworthy, the target mobility management network element re-obtains the non-cleartext information element from the terminal.

In a possible design, the communication apparatus further includes a processing module. The processing module is configured to determine whether the source mobility management network element is trustworthy. The sending module is further configured to send the second indication information and the fourth indication information to the terminal based on the first indication information when the processing module determines that the source mobility management network element is not trustworthy.

In a possible design, that the processing module is configured to determine whether the source mobility management network element is trustworthy has at least one of the following cases: (1) If the target mobility management network element determines that all mobility management network elements are trustworthy, the target mobility management network element determines that the source mobility management network element is trustworthy. (2) If the target mobility management network element determines that none of mobility management network elements is trustworthy, the target mobility management network element determines that the source mobility management network element is not trustworthy. (3) If the source mobility management network element is in a whitelist, the target mobility management network element determines that the source mobility management network element is trustworthy, where the whitelist includes at least one mobility management network element. (4) If the source mobility management network element is in a blacklist, the target mobility management network element determines that the source mobility management network element is not trustworthy, where the blacklist includes at least one mobility management network element.

In a possible design, the sending module is further configured to: when the processing module determines that the source mobility management network element is not trustworthy, skip an authentication procedure and send the second indication information and the fourth indication information to the terminal based on the first indication information.

In a possible design, the non-cleartext information element that is security protected by using the second root key is included in a NAS SMP message or a registration complete message.

In a possible design, the second indication information and the fourth indication information are included in a NAS SMC message.

In a possible design, the sending module is further configured to send a context request message to the source mobility management network element, where the context request message includes the first initial NAS message; and the receiving module is further configured to receive a context response message sent by the source mobility management network element, where the context response message includes the second root key, the first indication information, and the non-cleartext information element.

According to an eighth aspect, a communication apparatus is provided. The apparatus includes: a sending module, configured to send, to a source mobility management network element, a first initial non-access stratum (NAS) message from a terminal, where the first initial NAS message includes a non-cleartext information element that is security protected by using a first root key; and a receiving module, configured to receive a second root key, first indication information, and the non-cleartext information element that are sent by the source mobility management network element, where the first indication information is used to indicate that the second root key is a root key obtained by updating the first root key, where the sending module is further configured to send second indication information and third indication information to the terminal based on a preset rule and the first indication information, where the second indication information is used to indicate the terminal to update the first root key stored by the terminal to obtain the second root key, and the third indication information is used to indicate the terminal to resend an initial NAS message; and the receiving module is configured to receive a second initial NAS message sent by the terminal, where the second initial NAS message includes the non-cleartext information element that is security protected by using the second root key.

In a possible design, the preset rule includes: when the source mobility management network element is not trustworthy, the target mobility management network element re-obtains the non-cleartext information element from the terminal.

In a possible design, the communication apparatus further includes a processing module. The processing module is configured to determine whether the source mobility management network element is trustworthy. The sending module is configured to send the second indication information and the third indication information to the terminal based on the first indication information when the processing module determines that the source mobility management network element is not trustworthy.

In a possible design, that the processing module is configured to determine whether the source mobility management network element is trustworthy has at least one of the following cases:

(1) If the target mobility management network element determines that all mobility management network elements are trustworthy, the target mobility management network element determines that the source mobility management network element is trustworthy. (2) If the target mobility management network element determines that none of mobility management network elements is trustworthy, the target mobility management network element determines that the source mobility management network element is not trustworthy. (3) If the source mobility management network element is in a whitelist, the target mobility management network element determines that the source mobility management network element is trustworthy, where the whitelist includes at least one mobility management network element. (4) If the source mobility management network element is in a blacklist, the target mobility management network element determines that the source mobility management network element is not trustworthy, where the blacklist includes at least one mobility management network element.

In a possible design, the sending module is further configured to skip an authentication procedure and send the second indication information and the third indication information to the terminal based on the first indication information when the processing module determines that the source mobility management network element is not trustworthy.

In a possible design, the non-cleartext information element that is security protected by using the second root key is included in a NAS SMP message or a registration complete message.

In a possible design, the second indication information and the third indication information are included in a NAS SMC message.

In a possible design, the sending module is further configured to send a context request message to the source mobility management network element, where the context request message includes the first initial NAS message; and the receiving module is further configured to receive a context response message sent by the source mobility management network element, where the context response message includes the second root key, the first indication information, and the non-cleartext information element.

According to a ninth aspect, a communication apparatus is provided. The apparatus includes a processor. The processor is configured to: be coupled to a memory, read instructions in the memory, and implement the information obtaining method according to any one of the first aspect to the fourth aspect based on the instructions.

According to a tenth aspect, a computer-readable storage medium is provided. The computer-readable storage medium stores instructions; and when the instructions are run on a communication apparatus, the communication apparatus is enabled to perform the information obtaining method according to any one of the first aspect to the fourth aspect.

According to an eleventh aspect, a computer program product including instructions is provided. When the computer program product runs on a communication apparatus, the communication apparatus is enabled to perform the information obtaining method according to any one of the first aspect to the fourth aspect.

According to a twelfth aspect, a chip is provided. The chip includes a processing module and a communication interface. The communication interface is configured to transmit received code instructions to the processing module. The processing module is configured to run the code instructions, to support a communication apparatus in performing the information obtaining method according to any one of the first aspect to the fourth aspect. The code instructions may be from a memory inside the chip, or may be from a memory outside the chip. Optionally, the processing module may be a processor, a microprocessor, or an integrated circuit integrated on the chip. The communication interface may be an input/output circuit or a transceiver pin on the chip.

According to a thirteenth aspect, a communication system is provided. The system includes a terminal, a source mobility management network element, and a target mobility management network element. The terminal is configured to send a first non-access stratum (NAS) message to the target mobility management network element, where the first initial NAS message includes a non-cleartext information element that is security protected by using a first root key. The target mobility management network element is configured to send the first initial NAS message to the source mobility management network element. The source mobility management network element is configured to: after performing an integrity check on the first initial NAS message, update the first root key stored by the source mobility management network element, to generate a second root key; and send first indication information and the second root key to the target mobility management network element, where the first indication information is used to indicate that the second root key is a root key obtained by updating the first root key. The target mobility management network element is further configured to send second indication information and third indication information to the terminal based on the first indication information, where the second indication information is used to indicate the terminal to update the first root key stored by the terminal to obtain the second root key, and the third indication information is used to indicate the terminal to resend an initial NAS message. The terminal is further configured to: update, based on the second indication information, the first root key stored by the terminal, to generate the second root key; and send a second initial NAS message to the target mobility management network element based on the third indication information, where the second initial NAS message includes the non-cleartext information element that is security protected by using the second root key.

According to a fourteenth aspect, a communication system is provided. The system includes a terminal, a target mobility management network element, and a source mobility management network element. The terminal is configured to send a first non-access stratum (NAS) message to the target mobility management network element, where the first initial NAS message includes a non-cleartext information element that is security protected by using a first root key. The target mobility management network element is configured to send the first initial NAS message to the source mobility management network element. The source mobility management network element is configured to: after performing an integrity check on the first initial NAS message, update the first root key stored by the source mobility management network element, to generate a second root key; and send first indication information and the second root key to the target mobility management network element, where the first indication information is used to indicate that the second root key is a root key obtained by updating the first root key. The target mobility management network element is further configured to send second indication information and fourth indication information to the terminal based on the first indication information, where the second indication information is used to indicate the terminal to update the first root key stored by the terminal to obtain the second root key, and the fourth indication information is used to indicate the terminal to resend the non-cleartext information element. The terminal is further configured to: update, based on the second indication information, the first root key stored by the terminal, to generate the second root key; and send, to the target mobility management network element based on the fourth indication information, the non-cleartext information element that is security protected by using the second root key.

According to a fifteenth aspect, a communication system is provided. The system includes a terminal, a target mobility management network element, and a source mobility management network element. The terminal is configured to send a first non-access stratum (NAS) message to the target mobility management network element, where the first initial NAS message includes a non-cleartext information element that is security protected by using a first root key. The target mobility management network element is configured to send the first initial NAS message to the source mobility management network element. The source mobility management network element is configured to: after performing an integrity check on the first initial NAS message, decrypt the first initial NAS message, to obtain the at least one non-cleartext information element; update the first root key stored by the source mobility management network element, to generate a second root key; and send first indication information, the second root key, and the at least one non-cleartext information element to the target mobility management network element, where the first indication information is used to indicate that the second root key is a root key obtained by updating the first root key. The target mobility management network element is further configured to send second indication information and fourth indication information to the terminal based on a preset rule and the first indication information, where the second indication information is used to indicate the terminal to update the first root key stored by the terminal to obtain the second root key, and the fourth indication information is used to indicate the terminal to resend the non-cleartext information element. The terminal is further configured to: update, based on the second indication information, the first root key stored by the terminal, to generate the second root key; and send, to the target mobility management network element based on the fourth indication information, the at least one non-cleartext information element that is security protected by using the second root key.

According to a sixteenth aspect, a communication system is provided. The system includes a terminal, a target mobility management network element, and a source mobility management network element. The terminal is configured to send a first non-access stratum (NAS) message to the target mobility management network element, where the first initial NAS message includes a non-cleartext information element that is security protected by using a first root key. The target mobility management network element is configured to send the first initial NAS message to the source mobility management network element. The source mobility management network element is configured to: after performing an integrity check on the first initial NAS message, decrypt the first initial NAS message, to obtain the at least one non-cleartext information element; update the first root key stored by the source mobility management network element, to generate a second root key; and send first indication information, the second root key, and the at least one non-cleartext information element to the target mobility management network element, where the first indication information is used to indicate that the second root key is a root key obtained by updating the first root key. The target mobility management network element is further configured to send second indication information and third indication information to the terminal based on a preset rule and the first indication information, where the second indication information is used to indicate the terminal to update the first root key stored by the terminal to obtain the second root key, and the third indication information is used to indicate the terminal to resend an initial NAS message. The terminal is further configured to: update, based on the second indication information, the first root key stored by the terminal, to generate the second root key; and send a second initial NAS message to the target mobility management network element based on the third indication information, where the second initial NAS message includes the at least one non-cleartext information element that is security protected by using the second root key.

DETAILED DESCRIPTION OF EMBODIMENTS

Figure 1:
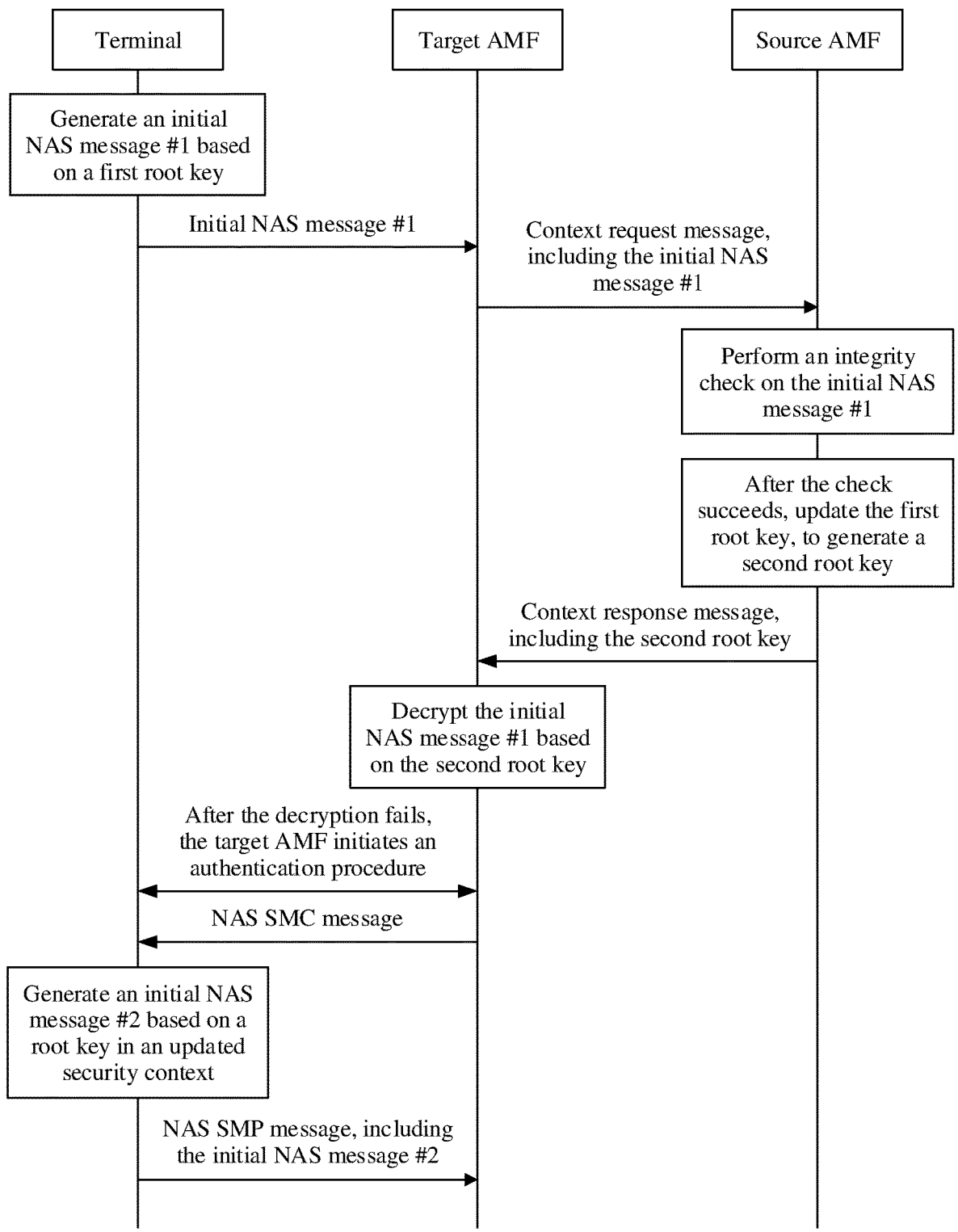
FIG. 1 is a flowchart of an information obtaining method in a current technology.

In the present disclosure, unless otherwise specified, "/" means "or". For example, A/B may represent A or B. "And/or" in this specification describes only an association relationship for describing associated objects and represents that three relationships may exist. For example, A and/or B may represent the following three cases: Only A exists, both A and B exist, and only B exists. In addition, "at least one" means one or more, and "a plurality of" means two or more. Words such as "first" and "second" do not limit a quantity and an execution sequence, and the words such as "first" and "second" do not indicate a definite difference.

It should be noted that in this application, the term such as "example" or "for example" is used to represent giving an example, an illustration, or a description. Any embodiment or design scheme described as an "example" or "for example" in this application should not be explained as being more preferred or having more advantages than another embodiment or design scheme. Exactly, use of the term such as "example" or "for example" is intended to present a related concept in a specific manner.

In the present disclosure, the "indication" may include a direct indication and an indirect indication, or may include an explicit indication and an implicit indication. Information indicated by a piece of information (such as first indication information or second indication information described below) is referred to as to-be-indicated information. In a specific implementation process, there are a plurality of manners of indicating the to-be-indicated information. For example, the to-be-indicated information may be directly indicated, where the to-be-indicated information itself, an index of the to-be-indicated information, or the like is indicated. For another example, the to-be-indicated information may be indirectly indicated by indicating other information, and there is an association relationship between the other information and the to-be-indicated information. For another example, only a part of the to-be-indicated information may be indicated, and the other part of the to-be-indicated information is already known or pre-agreed on. In addition, specific information may also be indicated by using a pre-agreed (for example, stipulated in a protocol) arrangement sequence of various pieces of information, to reduce indication overheads to some extent.

To facilitate understanding of technical solutions of this application, the following first briefly describes terms used in this application.

1. Initial NAS Message

The initial NAS message is the first NAS message sent when a terminal changes from an idle state to a connected state. It should be noted that when the terminal is in the idle state, the terminal does not establish a radio resource control (RRC) connection to a network side; when the terminal is in the connected state, the terminal establishes an RRC connection to the network side.

In an actual application scenario, the initial NAS message may be a registration request message, a service request message, a deregistration request message, or the like. This is not limited in the embodiments of this application.

In a 5G network, when a partly ciphering mechanism is introduced, the initial NAS message includes cleartext information and non-cleartext information. The cleartext information is information that does not need to be encrypted, and the non-cleartext information is information that needs to be encrypted. It should be noted that the non-cleartext information may also be referred to as encrypted information or ciphertext information.

Optionally, the cleartext information includes at least one of the following information elements: an extended protocol discriminator, a security header type, a spare half octet, a registration request message identity, a 5G system registration type, a next generation key set identifier (ngKSI), a 5G system mobile identity (5GS mobile identity), a UE security capability, an additional globally unique temporary UE identity (additional GUTI), a UE status, and an evolved packet system (EPS) NAS message container.

Optionally, the non-cleartext information includes at least one of the following information elements: a 5G mobility management capability (5GMM capability), a payload container, user plane data, and the like. The non-cleartext information may include an information element other than the cleartext information in the initial NAS message.

In the embodiments of this application, for ease of description, the information element included in the cleartext information may be referred to as a cleartext information element; the information element included in the non-cleartext information may be referred to as a ciphertext information element, a non-cleartext information element, or an encrypted information element.

2. Security Context

The security context refers to information that can be used to implement security protection (for example, encryption/decryption, and/or integrity protection/an integrity check) of data.

The security context may include one or more of the following: a root key, an encryption key, an integrity protection key, a specific parameter (such as a NAS count), a key set identifier (KSI for short), a security algorithm, a security indication (for example, an indication indicating whether encryption is enabled, an indication indicating whether integrity protection is enabled, an indication indicating a validity period of a key, or a key length), or the like.

The encryption key is a parameter input by a transmit end when the transmit end encrypts a cleartext based on an encryption algorithm to generate a ciphertext. If a symmetric encryption method is used, the encryption key and a decryption key are the same. A receive end may decrypt the ciphertext based on the same encryption algorithm and encryption key. In other words, the transmit end and the receive end may perform encryption and decryption based on a same key.

The integrity protection key is a parameter input by the transmit end when the transmit end performs integrity protection on a cleartext or a ciphertext based on an integrity protection algorithm. The receive end may perform, based on the same integrity protection algorithm and integrity protection key, an integrity check on data on which integrity protection is performed.

The security algorithm is an algorithm used to perform security protection on data, such as an encryption algorithm, a decryption algorithm, and an integrity protection algorithm.

3. Root Key

The root key is used to generate an encryption key and an integrity protection key. In the embodiments of this application, the root key may be referred to as a NAS root key, and is denoted as $K_{AMF}$. The encryption key may also be referred to as a NAS encryption key, and is denoted as $K_{NASenc}$. The integrity protection key may also be referred to as a NAS integrity protection key, and is denoted as $K_{NASint}$. It should be noted that for a specific procedure of generating the encryption key and the integrity protection key by using the root key, refer to a current technology. Details are not described herein in the embodiments of this application.

In the embodiments of this application, when a terminal registers with a source AMF, an authentication procedure is performed between the source AMF and the terminal, to separately generate a security context of the terminal on the terminal and the source AMF. In this case, a root key stored in the security context may be referred to as a first root key.

In the embodiments of this application, after the terminal is handed over from the source AMF to a target AMF, if the target AMF requests a security context of the terminal from the source AMF, due to a local policy of the source AMF, the source AMF may update the first root key in the security context stored by the source AMF. An updated first root key may be referred to as a second root key. It may be understood that the second root key is a root key obtained by updating the first root key.

The foregoing briefly describes the terms used in the embodiments of this application, and details are not described below again.

Currently, in a scenario in which a source AMF updates a root key in a security context, for a procedure in which a target AMF obtains a non-cleartext information element carried in initial NAS message, refer to FIG. 1. As shown in FIG. 1, a terminal generates an initial NAS message #1, where the initial NAS message #1 includes a non-cleartext information element that is security protected by using a first root key. Then, the terminal sends the initial NAS message #1 to the target AMF. When the target AMF does not locally have a security context of the terminal, the target AMF sends a context request message to the source AMF, where the context request message includes the initial NAS message #1. The source AMF performs an integrity check on the initial NAS message #1. After the integrity check performed on the initial NAS message #1 succeeds, the source AMF may update the first root key in the security context to a second root key. The source AMF sends a context response message to the target AMF, where the context response message includes a security context, where the security context includes the second root key. The target AMF decrypts the initial NAS message #1 based on the second root key in the security context. Because the initial NAS message #1 is security protected by using the first root key, the target AMF cannot successfully decrypt the initial NAS message #1. After the decryption fails, the target AMF initiates an authentication procedure, to help synchronize a security context between the target AMF and the terminal. After the authentication succeeds, the target AMF sends a NAS SMC message to the terminal, to request the terminal to resend an initial NAS message. After receiving the NAS SMC message, the terminal generates an initial NAS message #2 based on a root key (for example, a third root key) in an updated security context. The terminal sends a NAS SMP message to the target AMF, where the NAS SMP message includes the initial NAS message #2. In this way, after the authentication procedure is performed, a root key in a security context stored by the terminal is consistent with a root key in a security context stored by the target AMF. Therefore, the target AMF can decrypt the initial NAS message #2, to obtain the non-cleartext information element in the initial NAS message #2.

For the foregoing authentication procedure, refer to a current technology, and details are not described herein. For example, the target AMF sends an authentication request to the terminal, and the terminal returns an authentication response message to the target AMF. In addition, the authentication procedure may also be referred to as a re-authentication procedure. This is not limited in the embodiments of this application.

In the current technology, in the scenario in which the source AMF updates the root key in the security context stored by the source AMF, the target AMF needs to initiate the authentication procedure, where a plurality of pieces of signaling need to be exchanged between the target AMF and the terminal in the authentication procedure. As a result, relatively high signaling overheads are caused in the entire procedure in which the target AMF obtains the non-cleartext information element in the initial NAS message, and a delay for obtaining the non-cleartext information element by the target AMF is also increased.

To resolve the foregoing technical problem, this application provides an information obtaining method. For specific descriptions of the method, refer to the following descriptions.

The technical solutions provided in the embodiments of this application may be applied to various communication systems, for example, a communication system using a 5th generation (5G) communication technology, a future evolved system, or a plurality of converged communication systems. The technical solutions provided in this application may be applied to a plurality of application scenarios, for example, machine-to-machine (M2M), macro-micro communication, enhanced mobile broadband (eMBB), ultra-reliable low-latency communication (uRLLC), and massive machine-type communications (mMTC). These scenarios may include but are not limited to a scenario of communication between communication devices, a scenario of communication between network devices, a scenario of communication between a network device and a communication device, and the like. The following provides descriptions by using an example in which the technical solutions are applied to a scenario of communication between a network device and a terminal.

In addition, a network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may learn that with evolution of the network architecture and emergence of a new service scenario, the technical solutions provided in the embodiments of this application are also applicable to similar technical problems.

Figure 2:
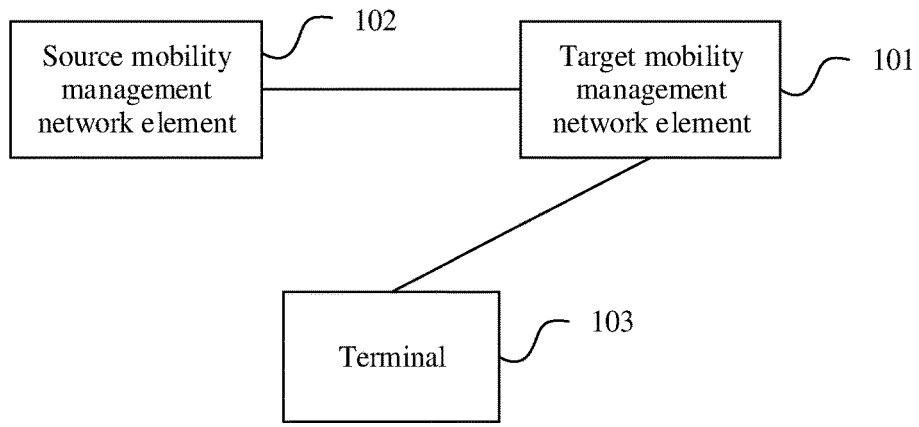
FIG. 2 is a schematic diagram of an architecture of a communication system according to an embodiment of this application.

FIG. 2 shows a communication system according to the embodiments of this application. The communication system includes a target mobility management network element 101, a source mobility management network element 102, and a terminal 103. The target mobility management network element 101 is a mobility management network element that provides a service such as mobility management for the terminal 103 after handover. The source mobility management network element 102 is a mobility management network element that provides a service such as mobility management for the terminal 103 before handover.

Optionally, the communication system shown in FIG. 2 may be applied to a current 5G network and another future network. This is not limited in the embodiments of this application.

Figure 3:
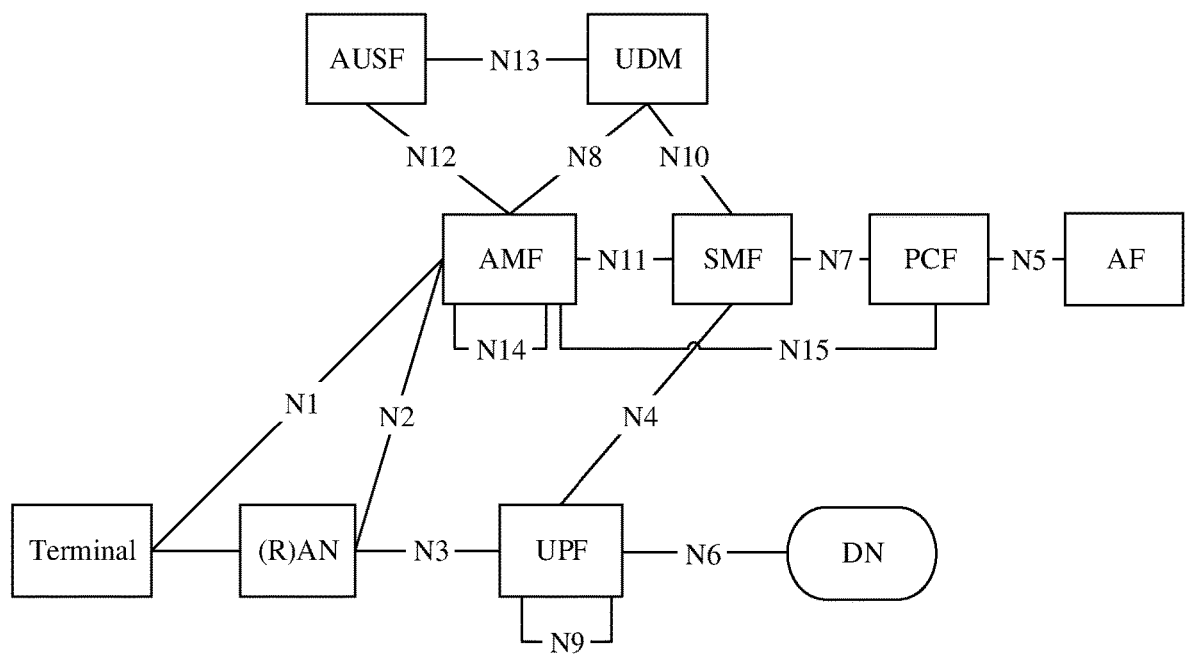
FIG. 3 is a schematic diagram of an architecture of a 5G network according to an embodiment of this application.

For example, FIG. 3 shows an architecture of a 5G network to which the technical solutions provided in the embodiments of this application are applicable. The 5G network may include a terminal, a radio access network (RAN) or an access network (AN) (where the RAN and the AN are collectively referred to as a (R)AN below), a core network, and a data network (DN). The core network includes a plurality of core network elements (or referred to as network function network elements), for example, an AMF network element, a session management function (SMF) network element, a policy control function (PCF) network element, a user plane function (UPF) network element, an application function network element, an authentication server function (AUSF) network element, and a unified data management (UDM) network element. In addition, the core network may further include some other network elements that are not shown. Details are not described herein in the embodiments of this application.

As shown in FIG. 3, a logical interface may exist between network elements (or devices). For example, a logical interface exists between the AMF network element and the SMF network element, where the interface is referred to as an N11 interface in this specification; a logical interface exists between the AMF network element and the terminal, where the interface is referred to as an N1 interface in this specification. Details are not described one by one herein in this specification. In addition, the name of the logical interface is merely an example, and constitutes no limitation.

It should be noted that the core network elements may have other names. The embodiments of this application are not limited thereto. For example, the AMF network element may also be referred to as an AMF for short, and the UPF network element may also be referred to as a UPF for short.

The terminal may be a device having a wireless transceiver function. The terminal may have different names, for example, user equipment (UE), an access terminal, a terminal unit, a terminal station, a mobile station, a remote station, a remote terminal, a mobile device, a wireless communication device, a terminal agent, or a terminal apparatus. The terminal may be deployed on land, where the deployment includes indoor or outdoor, or handheld or vehicle-mounted deployment, may be deployed on water (for example, on a ship), or may be deployed in air (for example, on an aerocraft, a balloon, or a satellite). The terminal includes a handheld device, a vehicle-mounted device, a wearable device, or a computing device that has a wireless communication function. For example, the terminal may be a mobile, a tablet computer, or a computer having a wireless transceiver function. Alternatively, the terminal device may be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city, a wireless terminal in a smart home, or the like. In the embodiments of this application, an apparatus for implementing a function of the terminal may be a terminal, or may be an apparatus that can support the terminal in implementing the function, for example, a chip system. In the embodiments of this application, the chip system may include a chip, or may include a chip and another discrete component. In the embodiments of this application, an example in which the apparatus for implementing the function of the terminal is a terminal is used to describe the technical solutions provided in the embodiments of this application.

The AMF may be configured to perform connection management, mobility management, registration management, access authentication and authorization, reachability management, security context management, SMF network element selection, and the like. The SMF network element may be configured to perform session management such as session establishment, modification, and release, UPF network element selection and control, service and session continuity mode selection, and a roaming service. The PCF network element may be configured to provide a policy control service, obtain subscription information related to policy decision, and the like. The UPF network element may be configured to process an event related to a user plane, for example, transmit or route a data packet, detect a data packet, report a service volume, process quality of service (QoS), perform lawful interception, and store a downlink data packet.

In the embodiments of this application, when the communication system shown in FIG. 2 is applied to the 5G network shown in FIG. 3, the target mobility management network element 101 and the source mobility management network element 102 may be AMFs in the 5G network, and the terminal 103 may be a terminal in the 5G network.

Optionally, the target mobility management network element 101, the source mobility management network element 102, or the terminal 103 shown in FIG. 2 may be implemented by one device, or may be implemented by a plurality of devices, or may be a function module in a device. This is not specifically limited in the embodiments of this application. It may be understood that the foregoing functions may be network elements in a hardware device, or may be software functions running on dedicated hardware, or may be virtualization functions instantiated on a platform (for example, a cloud platform).

Figure 4:
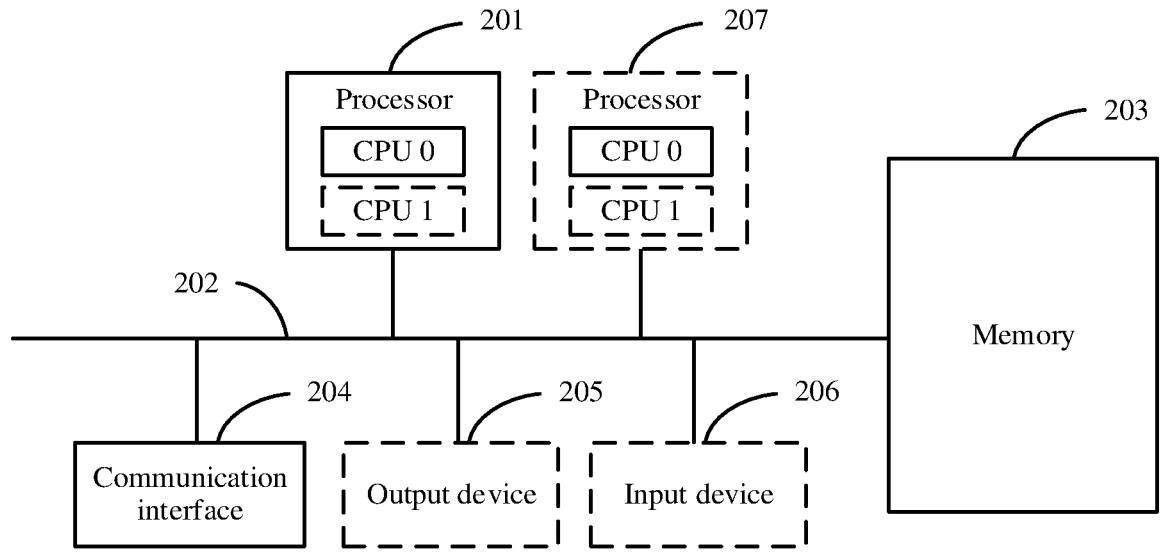
FIG. 4 is a schematic diagram of a structure of a communication apparatus according to an embodiment of this application.

For example, the target mobility management network element 101, the source mobility management network element 102, or the terminal 103 shown in FIG. 2 may be implemented by a communication apparatus in FIG. 4. FIG. 4 is a schematic diagram of a structure of a communication apparatus according to an embodiment of this application. As shown in FIG. 4, the communication apparatus includes at least one processor 201, 207, a communication line 202, a memory 203, and at least one communication interface 204.

The at least one processor 201, 207 may be one or more of a general-purpose central processing unit (CPU), a microprocessor, an application-specific integrated circuit (ASIC), or one or more integrated circuits that are configured to control program execution of the solutions in this application.

The communication line 202 may include a path for transmitting information between the foregoing components.

The communication interface 204 is configured to communicate with another device or communication network, such as the Ethernet, a radio access network (RAN), or a wireless local area network (WLAN) by using any apparatus such as a transceiver.

The memory 203 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in an instruction form or a data structure form and that can be accessed by a computer, but is not limited thereto. The memory may exist independently, and is connected to the processor through the communication line 202. The memory may alternatively be integrated with the processor.

The memory 203 is configured to store computer-executable instructions for executing the solutions of this application, and the at least one processor 201, 207 controls the execution. The at least one processor 201, 207 is configured to execute the computer-executable instructions stored in the memory 203, to implement the information obtaining methods provided in the following embodiments of this application.

Optionally, the computer-executable instructions in this embodiment may also be referred to as application program code. This is not specifically limited in this embodiment of this application.

During specific implementation, in an embodiment, the processor 201 or the processor 207 may include one or more CPUs, for example, a CPU 0 and a CPU 1 in FIG. 4.

During specific implementation, in an embodiment, the communication apparatus 300 may include a plurality of processors, for example, the processor 201 and a processor 207 in FIG. 4. Each of these processors may be a single-core (single-CPU) processor or a multi-core (multi-CPU) processor. The processor herein may refer to one or more devices, circuits, and/or processing cores configured to process data (for example, computer program instructions).

During specific implementation, in an embodiment, the communication apparatus may further include an output device 205 and an input device 206. The output device 205 communicates with the at least one processor 201, 207, and may display information in a plurality of manners. For example, the output device 205 may be a liquid crystal display (LCD), a light emitting diode (LED) display device, a cathode ray tube (CRT) display device, or a projector. The input device 206 communicates with the processor 201, and may receive input of a user in a plurality of manners. For example, the input device 206 may be a mouse, a keyboard, a touchscreen device, or a sensing device.

The following describes the technical solutions provided in the embodiments of this application with reference to the accompanying drawings in the embodiments of this application.

Figure 5:
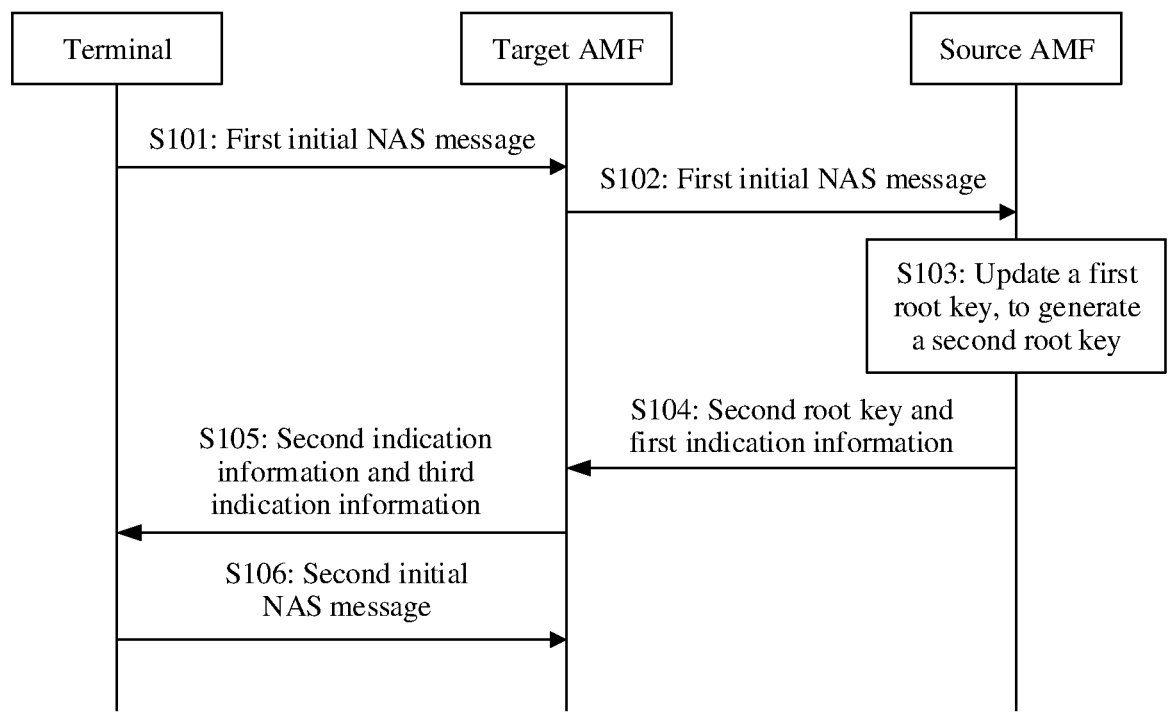
FIG. 5 is a schematic flowchart of an information obtaining method according to an embodiment of this application.

FIG. 5 shows an information obtaining method according to an embodiment of this application. The method includes the following steps.

S101: A terminal sends a first initial NAS message to a target AMF, so that the target AMF receives the first initial NAS message from the terminal.

The first initial NAS message is an initial NAS message that is security protected by using a first root key. The first initial NAS message includes a non-cleartext information element that is integrity protected by using the first root key.

It may be understood that the first root key is a root key stored in a current security context of the terminal. The first root key may be used to generate a first encryption key and a first integrity protection key. In other words, the first encryption key and the first integrity protection key are derived from the first root key.

In an implementation, the terminal encrypts the cleartext information element and the non-cleartext information element by using the first encryption key, to construct a first NAS message container. Then, the terminal performs integrity protection on the first initial NAS message container by using the first integrity protection key. Finally, the terminal constructs the first initial NAS message by using the cleartext information and the first NAS message container.

S102: The target AMF sends the first initial NAS message to a source AMF, so that the source AMF receives the first initial NAS message sent by the target AMF.

In this embodiment, the target AMF may obtain the cleartext information in the first initial NAS message by parsing the first initial NAS message. Then, the target AMF determines the source AMF based on a 5GS mobile identity in the cleartext information.

In an implementation, the target AMF sends a context requestmessage to the source AMF, where the context request message is used to request a security context of the terminal, and the context request message includes the first initial NAS message.

S103: The source AMF updates the first root key, to generate a second root key.

It may be understood that the second root key is a root key obtained by updating the first root key. The second root key may be used to generate a second encryption key and a second integrity protection key. In other words, the second encryption key and the second integrity protection key may be derived from the second root key.

Optionally, after receiving the first initial NAS message, the source AMF parses the first initial NAS message to obtain the cleartext information in the first initial NAS message. Then, the source AMF obtains the security context of the terminal based on the 5GS mobile identity in the cleartext information. The source AMF may perform an integrity check on the first initial NAS message based on the integrity protection key in the security context. When the integrity check performed on the first initial NAS message succeeds (that is, when the source AMF can determine that the first initial NAS message is complete), the source AMF may update the first root key based on a local policy, to generate the second root key.

For example, the local policy includes: When the source AMF determines that the target AMF is not trustworthy, the source AMF updates a root key. In this way, key isolation between the AMFs can be implemented. This prevents an attacker from directly obtaining a root key (namely, the first root key) currently used by the terminal and decrypting content of communication between the terminal and the source AMF after compromising the target AMF. This helps improve security of a communication network.

For example, that the source AMF determines whether the target AMF is trustworthy includes: The source AMF may determine that none of AMFs is trustworthy, or the source AMF may determine that an AMF in a blacklist is not trustworthy, or the source AMF may determine that an AMF that is not in a whitelist is not trustworthy.

In an implementation, the source AMF generates the second root key based on the first root key, a direction value, and an uplink NAS count. It may be understood that, for a key generation algorithm used by the source AMF, refer to a current technology. Details are not described herein.

The direction value is used to indicate a data transmission direction (for example, an uplink direction or a downlink direction). For example, the direction value may be 0x00, indicating the uplink direction.

The uplink NAS count is used to count a quantity of NAS messages sent by the terminal to a network side. The uplink NAS count may include an uplink non-access stratum sequence number (NAS sequence number, NAS SQN) and an uplink non-access stratum overflow (NAS OVERFLOW). The source AMF and the terminal jointly maintain the uplink NAS count. The source AMF may determine the uplink NAS count based on the uplink NAS SQN carried in the first initial NAS message and the uplink NAS overflow stored by the source AMF.

S104: The source AMF sends the second root key and first indication information to the target AMF, so that the target AMF receives the second root key and the first indication information that are sent by the source AMF.

The first indication information is used to indicate that the second root key is a root key obtained after update. In other words, the first indication information is used to indicate that the second root key is a root key obtained by updating the first root key. Optionally, the first indication information may be denoted as keyAmfHDerivationInd. This is not limited in this embodiment of this application.

In an implementation, the source AMF sends a context response message to the target AMF, where the context response message is used to feed back the security context of the terminal to the target AMF, and the context response message includes the first indication information and the second root key.

Optionally, the context response message may be referred to as an Namf_Communication_UEContextTransfer response message.

It should be noted that the second root key is stored in the security context. The first indication information may be stored in the security context, or may be an independent information element in the context response message.

In this embodiment, after receiving the second root key and the first indication information, the target AMF may determine the second encryption key and the second integrity protection key based on the second root key, to help the target AMF perform corresponding encryption/decryption by using the second encryption key and perform a corresponding check by using the second integrity protection key.

S105: The target AMF sends second indication information and third indication information to the terminal based on the first indication information, so that the terminal receives the second indication information and the third indication information that are sent by the target AMF.

The second indication information is used to indicate the terminal to update the first root key stored by the terminal to obtain the second root key. The second indication information may be denoted as K_AMF_change_flag. This is not limited in this embodiment. It may be understood that after receiving the second indication information, the terminal updates the first root key based on the second indication information, to obtain the second root key. Further, the terminal derives the second encryption key and the second integrity protection key based on the second root key.

The third indication information is used to indicate the terminal to resend an initial NAS message. It may be understood that content of the resent initial NAS message is the same as that of the previously sent first initial NAS message.

Optionally, the second indication information and the third indication information may be carried in a NAS SMC message. In this embodiment, the NAS SMC message may be integrity protected by using the second integrity protection key, to avoid being tampered with by an attacker.

It should be noted that the third indication information may be an independent information element in the NAS SMC message. In this way, if the NAS SMC message includes the independent information element, it indicates that the NAS SMC message carries the third indication information. If the NAS SMC message does not include the independent information element, it indicates that the NAS SMC message does not carry the third indication information.

Alternatively, the NAS SMC message may indicate, by using a value of one bit field, whether the NAS SMC message carries the third indication information. For example, the bit field includes only one bit, where "0" indicates that the NAS SMC message carries the third indication information, and "1" indicates that the NAS SMC message does not carry the third indication information.

For an implementation of the second indication information in the NAS SMC message, refer to related descriptions of the third indication information. Details are not described herein again.

In an implementation, after receiving the second root key and the first indication information, the target AMF decrypts, based on the second root key, the non-cleartext information element that is security protected in the first initial NAS message. It may be understood that, because the non-cleartext information element in the first initial NAS message is security protected by using the first root key, the target AMF cannot successfully decrypt the non-cleartext information element that is security protected in the first initial NAS message. After the decryption fails, the target AMF skips an authentication procedure and sends the second indication information and the third indication information to the source AMF based on the first indication information.

In another implementation, after receiving the second root key and the first indication information, the target AMF does not decrypt the non-cleartext information element that is security protected in the first initial NAS message; but directly skips an authentication procedure and sends the second indication information and the third indication information to the source AMF based on the first indication information. It may be understood that, because the target AMF may learn, based on the first indication information, that the second root key is received but the second root key cannot be used to decrypt the first initial NAS message, the AMF does not need to perform a procedure of decrypting the first initial NAS message by using the second root key. Therefore, time consumed for the decryption procedure is saved, and a delay for obtaining the non-cleartext information element by the target AMF is reduced.

S106: The terminal sends a second initial NAS message to the target AMF, so that the target AMF receives the second initial NAS message.

The second initial NAS message is an initial NAS message that is security protected by using the second root key. The second initial NAS message includes the non-cleartext information element that is security protected by using the second root key.

In an implementation, the terminal updates, based on the second indication information, the first root key stored by the terminal, to obtain the second root key. Then, the terminal generates the second initial NAS message based on the third indication information, and sends the second initial NAS message to the target AMF. In this way, because the target AMF obtains the second root key from the source AMF in advance, the target AMF can decrypt, by using the second root key, the non-cleartext information element that is security protected in the second initial NAS message, to obtain the non-cleartext information element.

Optionally, the terminal may generate the second initial NAS message in the following manner: The terminal encrypts the cleartext information and the non-cleartext information by using the second encryption key, to construct a second NAS message container. Then, the terminal performs integrity protection on the second initial NAS message container by using the second integrity protection key. Finally, the terminal constructs the second initial NAS message by using the cleartext information and the second initial NAS message container.

It may be understood that content of the non-cleartext information element included in the first initial NAS message is the same as that of the non-cleartext information element included in the second initial NAS message, but root keys used for security protection are different.

In this embodiment, the second initial NAS message may be included in a NAS SMP message. Alternatively, when the initial NAS message is a registration request message, the second initial NAS message may be included in a registration complete message.

Based on the technical solution shown in FIG. 5, the target AMF determines, based on the first indication information from the source AMF, that the first root key has been updated to the second root key. In this case, the target AMF sends the second indication information to the terminal based on the first indication information, so that the terminal can update the first root key to the second root key. This ensures that root keys stored by the target AMF and the terminal are the same. In addition, the target AMF further sends the third indication information to the terminal, to obtain the second initial NAS message sent by the terminal. Because the second initial NAS message includes the non-cleartext information element that is security protected by using the second root key, and the target AMF has obtained the second root key from the source AMF, the target AMF can decrypt the non-cleartext information element that is security protected in the second initial NAS message, to obtain the non-cleartext information element. Compared with the current technology, the target AMF does not need to initiate the authentication procedure. This helps reduce signaling overheads and saves time consumed for the authentication procedure.

Figure 6:
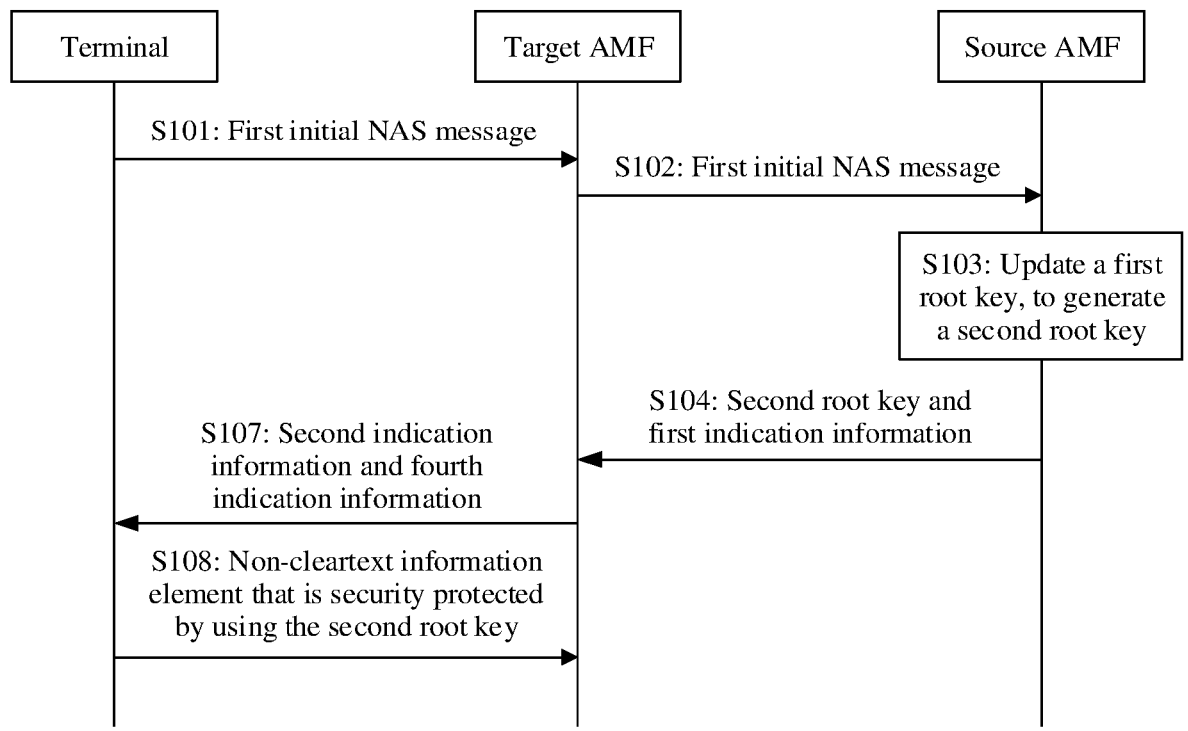
FIG. 6 is a schematic flowchart of another information obtaining method according to an embodiment of this application.

Optionally, as shown in FIG. 6, steps S105 and S106 in FIG. 5 may be replaced with steps S107 and S108.

S107: The target AMF sends second indication information and fourth indication information to the terminal based on the first indication information.

For related descriptions of the second indication information, refer to descriptions in step S105. Details are not described herein again.

The fourth indication information is used to indicate the terminal to resend a non-cleartext information element. In this embodiment, the non-cleartext information element that needs to be resent may be a part or all of the non-cleartext information element carried in the first initial NAS message.

It should be noted that, if the non-cleartext information element that needs to be resent is a part of the non-cleartext information element carried in the first initial NAS message, a specific non-cleartext information element that needs to be resent may be pre-determined in a protocol between the target AMF and the terminal, or is defined in a standard, or is indicated by the fourth indication information.

For example, the fourth indication information may include an identifier of each non-cleartext information element that needs to be resent. For example, the first initial NAS message carries a non-cleartext information element #1, a non-cleartext information element #2, and a non-cleartext information element #3, and the fourth indication information may include an identifier of the non-cleartext information element #1 and an identifier of the non-cleartext information element #3. In this way, the terminal only needs to resend the non-cleartext information element #1 and the non-cleartext information element #3 to the target AMF, and does not need to resend the non-cleartext information element #2.

For another example, the fourth indication information includes a bitmap, every n bits in the bitmap correspond to one non-cleartext information element, and values of the n bits are used to indicate the terminal to resend/not to resend the non-cleartext information element corresponding to the n bits. For example, one bit corresponds to one non-cleartext information element, where "0" is used to indicate the terminal not to resend the non-cleartext information element, and "1" is used to indicate the terminal to resend the non-cleartext information element. For example, it is assumed that the initial NAS message carries a non-cleartext information element #1, a non-cleartext information element #2, and a non-cleartext information element #3, and one bit in the bitmap corresponds to one non-cleartext information element in the initial NAS message, to be specific, the first bit in the bitmap corresponds to the non-cleartext information element #1, the second bit in the bitmap corresponds to the non-cleartext information element #2, and the third bit in the bitmap corresponds to the non-cleartext information element #3. If the bitmap included in the fourth indication information #2 is "010", the fourth indication information #2 is used to indicate the terminal to resend the non-cleartext information element #2. If the bitmap included in the fourth indication information #2 is "110", the fourth indication information #2 is used to indicate the terminal to resend the non-cleartext information element #1 and the non-cleartext information element #2.

It may be understood that the fourth indication information may alternatively indicate, in another manner, a non-cleartext information element that needs to be resent by the terminal to the target AMF.

Optionally, the second indication information and the fourth indication information may be included in a NAS SMC message.

In an implementation, after receiving the second root key and the first indication information, the target AMF decrypts, based on the second root key, the non-cleartext information element that is security protected in the first initial NAS message. It may be understood that, because the non-cleartext information element in the first initial NAS message is security protected by using the first root key, the target AMF cannot successfully decrypt the non-cleartext information element that is security protected in the first initial NAS message. After the decryption fails, the target AMF skips an authentication procedure and sends the second indication information and the fourth indication information to the source AMF based on the first indication information.

In another implementation, after receiving the second root key and the first indication information, the target AMF does not decrypt the non-cleartext information element that is security protected in the first initial NAS message; but directly skips an authentication procedure and sends the second indication information and the fourth indication information to the source AMF based on the first indication information. It may be understood that, because the target AMF may learn, based on the first indication information, that the second root key is received but the second root key cannot be used to decrypt the first initial NAS message, the AMF doesn't need to perform a procedure of decrypting the first initial NAS message by using the second root key. Therefore, time consumed for the decryption procedure is saved, and a delay for obtaining the non-cleartext information element by the target AMF is reduced.

S108: The terminal sends, to the target AMF, the non-cleartext information element that is security protected by using the second root key, so that the target AMF receives the non-cleartext information element that is sent by the terminal and that is security protected by using the second root key.

That the non-cleartext information element is security protected by using the second root key includes: The non-cleartext information element is encrypted by using the second encryption key, and/or the non-cleartext information element is integrity protected by using the second integrity protection key.

In an implementation, the terminal updates, based on the second indication information, the first root key stored by the terminal, to obtain the second root key. Then, the terminal generates, based on the fourth indication information, the non-cleartext information element that is security protected by using the second root key, and sends the non-cleartext information element that is security protected by using the second root key to the target AMF. In this way, because the target AMF obtains the second root key from the source AMF in advance, the target AMF can decrypt the non-cleartext information element that is security protected by using the second root key, to obtain the non-cleartext information element.

In this embodiment, the non-cleartext information element that is security protected by using the second root key may be included in a NAS SMP message. Alternatively, when the first initial NAS message is a registration request message, the non-cleartext information element that is security protected by using the second root key may be included in a registration complete message.

It may be understood that, compared with steps S105 and S106, in steps S107 and S108, the terminal only needs to send the non-cleartext information element to the target AMF, but does not need to send a complete initial NAS message. In this way, signaling overheads are reduced.

Based on the technical solution shown in FIG. 6, the target AMF determines, based on the first indication information from the source AMF, that the first root key has been updated to the second root key. In this case, the target AMF sends the second indication information to the terminal based on the first indication information, so that the terminal can update the first root key to the second root key. This ensures that root keys stored by the target AMF and the terminal are the same. In addition, the target AMF further sends the fourth indication information to the terminal, to obtain the non-cleartext information element that is sent by the terminal and that is security protected by using the second root key. Because the target AMF has obtained the second root key from the source AMF, the target AMF can decrypt the non-cleartext information element that is security protected by using the second root key, to obtain the non-cleartext information element. Compared with the current technology, the target AMF does not need to initiate the authentication procedure. This helps reduce signaling overheads and saves time consumed for the authentication procedure.

Figure 7:
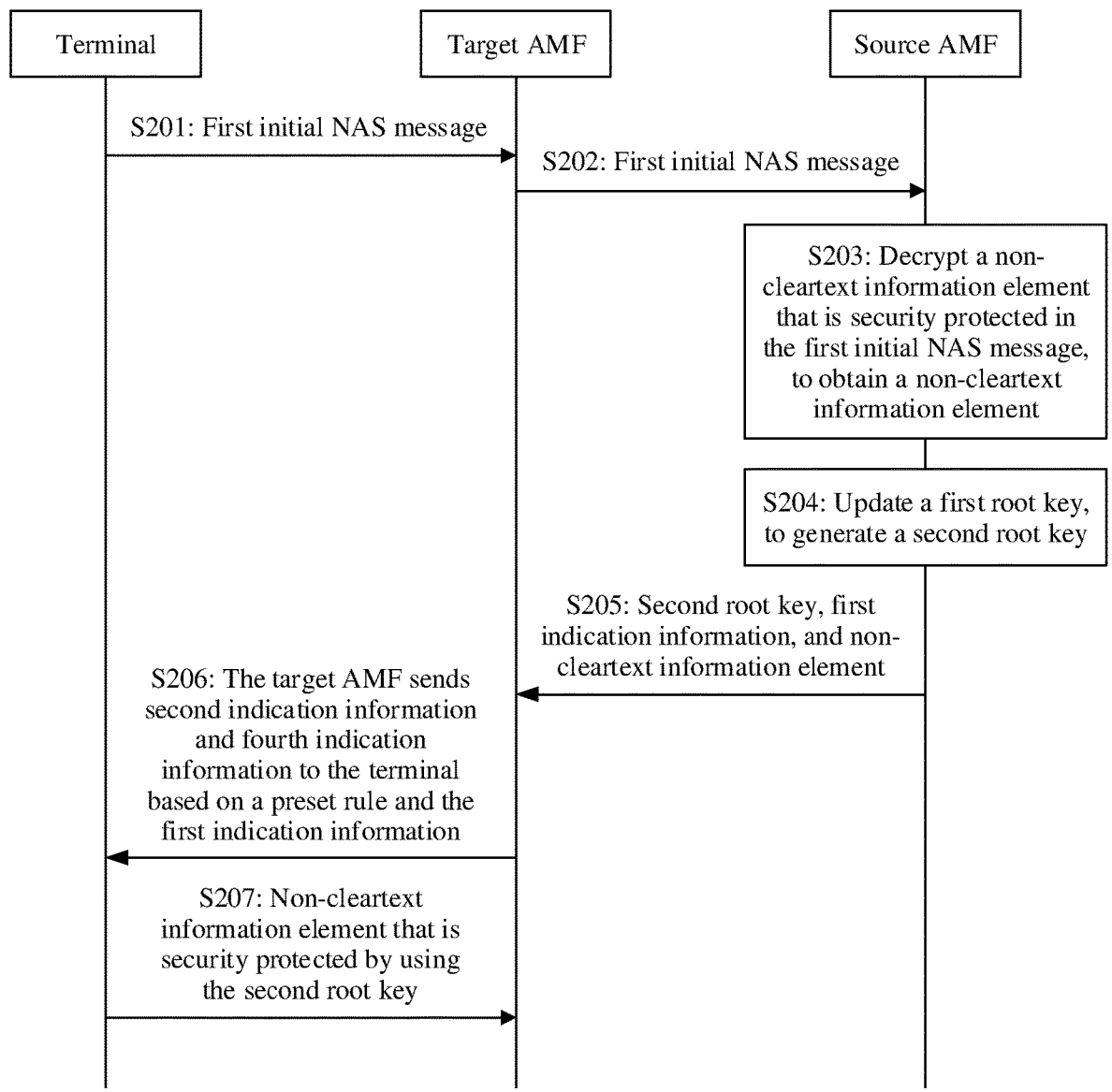
FIG. 7 is a schematic flowchart of another information obtaining method according to an embodiment of this application.

FIG. 7 shows another information obtaining method according to an embodiment of this application. The method includes the following steps.

S201: A terminal sends a first initial NAS message to a target AMF, so that the target AMF receives the first initial NAS message from the terminal.

S202: The target AMF sends the first initial NAS message to a source AMF, so that the source AMF receives the first initial NAS message sent by the target AMF.

Steps S201 and S202 are similar to steps S101 and S202. For specific descriptions, refer to the embodiment shown in FIG. 5. Details are not described herein again.

S203: The source AMF decrypts the non-cleartext information element that is security protected in the first initial NAS message, to obtain a non-cleartext information element.

The non-cleartext information element obtained by the source AMF may be all or a part of the non-cleartext information element that is security protected in the first initial NAS message. For example, the first initial NAS message carries a non-cleartext information element #1, a non-cleartext information element #2, and a non-cleartext information element #3. The non-cleartext information element obtained by the source AMF may be the non-cleartext information element #1 and the non-cleartext information element #2, or the non-cleartext information element obtained by the source AMF may be the non-cleartext information element #2, or the non-cleartext information element obtained by the source AMF may be the non-cleartext information element #1, the non-cleartext information element #2, and the non-cleartext information element #3.

In an implementation, the source AMF obtains a security context based on a 5GS mobile identity in cleartext information carried in the first initial NAS message. Then, the source AMF derives a first integrity protection key and a first encryption key based on a first root key in the security context. The source AMF performs an integrity check on the first initial NAS message based on the first integrity protection key. After the integrity check performed on the first initial NAS message succeeds, the source AMF decrypts a NAS message container in the first initial NAS message based on the first encryption key, to obtain the non-cleartext information element.

S204: The source AMF updates the first root key, to generate a second root key.

Step S204 is the same as step S103. For detailed descriptions, refer to the embodiment shown in FIG. 5. Details are not described herein again.

S205: The source AMF sends the second root key, first indication information, and the non-cleartext information element to the target AMF, so that the target AMF receives the second root key, the first indication information, and the non-cleartext information element that are sent by the source AMF.

For related descriptions of the second root key and the first indication information, refer to the descriptions in step S104. Details are not described herein again.

In an implementation, the source AMF sends a context response message to the target AMF, where the context response message is used to feed back a context to the target AMF, and the context response message includes the second root key, the first indication information, and the non-cleartext information element.

Optionally, the context response message may be referred to as a Namf_Communication_UEContextTransfer response message.

S206: The target AMF sends second indication information and fourth indication information to the terminal based on a preset rule and the first indication information.

For related descriptions of the second indication information, refer to the descriptions in step S105. For related descriptions of the fourth indication information, refer to the descriptions in step S107. Details are not described herein again.

Optionally, the preset rule includes: when the source AMF is not trustworthy, the target AMF re-obtains the non-cleartext information element. It may be understood that, when the source AMF is not trustworthy, the non-cleartext information element sent by the source AMF to the target AMF may be tampered with. In this way, the target AMF needs to re-obtain the non-cleartext information element, to ensure that the non-cleartext information element obtained by the target AMF is secure and trustworthy. This helps ensure security of a communication network.

Based on the preset rule, step S206 may be specifically implemented as follows: The target AMF determines whether the source AMF is trustworthy; and if the source AMF is not trustworthy, the target AMF sends the second indication information and the fourth indication information to the terminal based on the first indication information.

It may be understood that if the preset rule is another rule, a specific implementation of step S206 may be correspondingly changed. Details are not described herein.

Optionally, that the target AMF determines whether the source AMF is trustworthy has at least one of the following cases:

Case 1: If the target AMF determines that all AMFs are trustworthy, the target AMF determines that the source AMF is trustworthy.

Case 2: If the target AMF determines that none of AMFs is trustworthy, the target AMF determines that the source AMF is not trustworthy.

Case 3: If the source AMF is in a whitelist, the target AMF determines that the source AMF is trustworthy. The whitelist is used to record at least one AMF that is trustworthy. Optionally, if the source AMF is not in the whitelist, the target AMF may determine that the source AMF is not trustworthy. Alternatively, if the source AMF is not in the whitelist, the target AMF further determines, based on other information (for example, a deployment position) of the source AMF, whether the source AMF is trustworthy.

Case 4: If the source AMF is in a blacklist, the target AMF determines that the source AMF is not trustworthy. The blacklist is used to record at least one AMF that is not trustworthy. Optionally, if the source AMF is not in the blacklist, the target AMF may determine that the source AMF is trustworthy. Alternatively, if the source AMF is not in the blacklist, the target AMF further determines, based on other information (for example, a deployment position) of the source AMF, whether the source AMF is trustworthy.

The whitelist and/or the blacklist are/is preconfigured, or are/is specified in a protocol. This is not limited in this embodiment of this application.

In addition, the foregoing cases 1 to 4 are merely examples. The target AMF may alternatively determine, in another implementation, whether the source AMF is trustworthy. Details are not described herein one by one.

It may be understood that if the target AMF determines that the source AMF is trustworthy, it indicates that the non-cleartext information element from the source AMF is trustworthy (that is, the non-cleartext information element is not tampered with), so that the target AMF may directly use the non-cleartext information element. If the target AMF determines that the source AMF is not trustworthy, it indicates that the non-cleartext information element from the source AMF is not trustworthy. In this way, the target AMF needs to re-obtain the non-cleartext information element. For example, when the non-cleartext information element is user plane data, because the target AMF does not need to process the information element, but forwards the information element for a user, the target AMF cannot learn whether the information element is tampered with. If the target AMF determines that the source AMF is not trustworthy, the target AMF needs to re-obtain the user plane data.

In an implementation, the target AMF decrypts, based on the second root key, the non-cleartext information element that is security protected in the first initial NAS message. It may be understood that, because the non-cleartext information element in the first initial NAS message is security protected by using the first root key, the target AMF cannot successfully decrypt the non-cleartext information element that is security protected in the first initial NAS message. After the decryption fails, the target AMF skips an authentication procedure and sends the second indication information and the fourth indication information to the source AMF based on the first indication information.

In another implementation, the target AMF does not decrypt the non-cleartext information element that is security protected in the first initial NAS message; but directly skips an authentication procedure and sends the second indication information and the fourth indication information to the source AMF based on the first indication information. It may be understood that, because the target AMF may learn, based on the first indication information, that the second root key is received but the second root key cannot be used to decrypt the first initial NAS message, the AMF is not configured to perform a procedure of decrypting the first initial NAS message by using the second root key. Therefore, time consumed for the decryption procedure is saved, and a delay for obtaining the non-cleartext information element by the target AMF is reduced.

S207: The terminal sends, to the target AMF, the non-cleartext information element that is security protected by using the second root key, so that the target AMF receives the non-cleartext information element that is security protected by using the second root key.

Step S207 is the same as step S108. For specific descriptions, refer to step S108. Details are not described herein again.

Based on the technical solution shown in FIG. 7, the target AMF determines, based on the first indication information from the source AMF, that the first root key has been updated to the second root key. In this case, the target AMF sends the second indication information to the terminal based on the first indication information, so that the terminal can update the first root key to the second root key. This ensures that root keys stored by the target AMF and the terminal are the same. In addition, the target AMF further sends the fourth indication information to the terminal, to obtain the non-cleartext information element that is sent by the terminal and that is security protected by using the second root key. Because the target AMF has obtained the second root key from the source AMF, the target AMF can decrypt the non-cleartext information element that is security protected by using the second root key, to obtain the non-cleartext information element. Compared with a current technology, the target AMF does not need to initiate the authentication procedure. This helps reduce signaling overheads and saves time consumed for the authentication procedure.

In addition, when the source AMF is not trustworthy, the target AMF does not trust the non-cleartext information element sent by the source AMF, and re-obtains the non-cleartext information element from the terminal. This helps ensure the security of the network.

Figure 8:
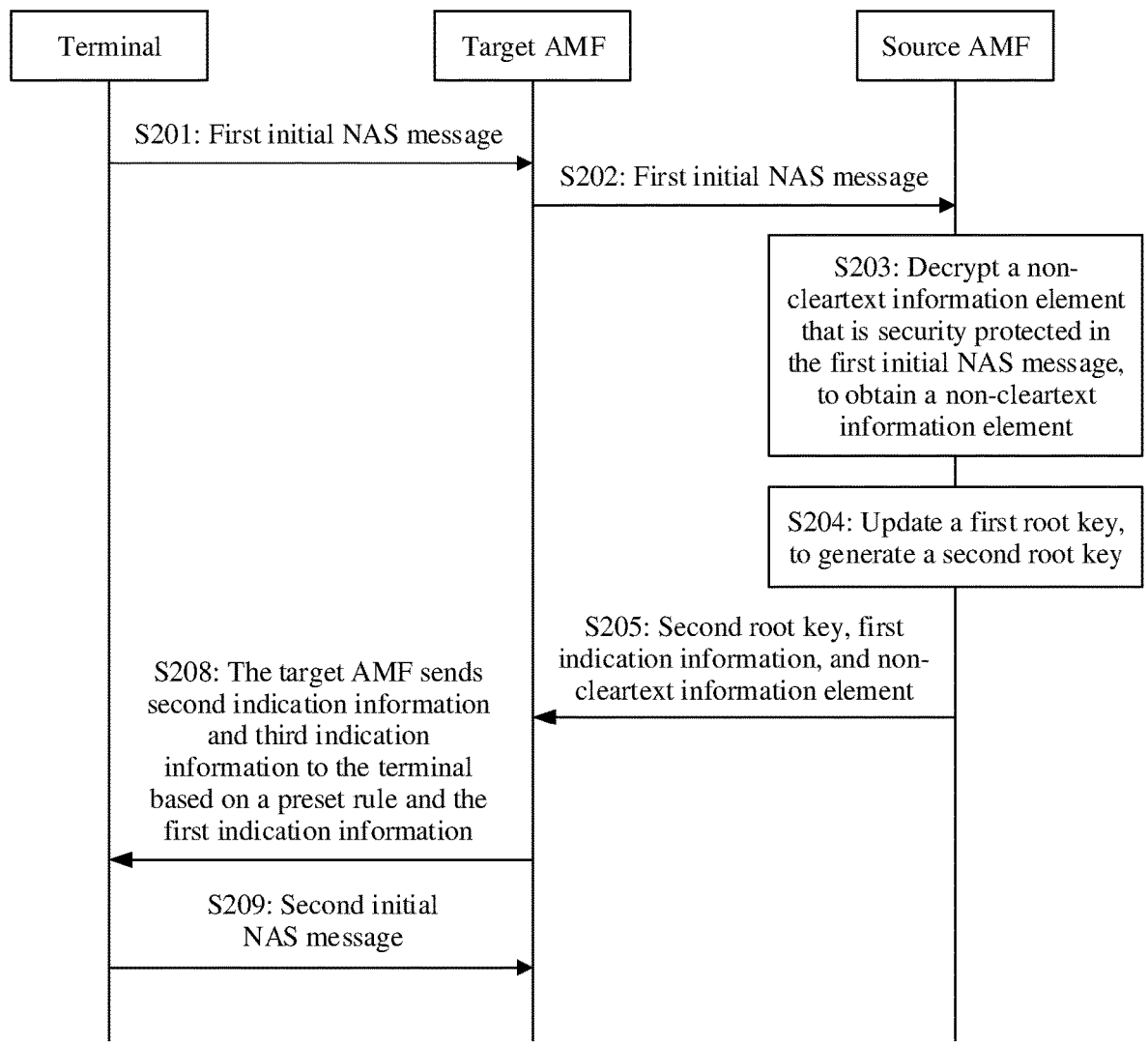
FIG. 8 is a flowchart of another information obtaining method according to an embodiment of this application.

Optionally, as shown in FIG. 8, steps S206 and S207 may be replaced with steps S208 and S209.

S208: The target AMF sends second indication information and third indication information to the terminal based on a preset rule and the first indication information, so that the terminal receives the second indication information and the third indication information that are sent by the target AMF.

For related descriptions of the second indication information and the third indication information, refer to the descriptions in step S105. For related descriptions of the preset rule, refer to the descriptions in step S206. Details are not described herein again.

In an implementation, the target AMF decrypts, based on the second root key, the non-cleartext information element that is security protected in the first initial NAS message. It may be understood that, because the non-cleartext information element in the first initial NAS message is security protected by using the first root key, the target AMF cannot successfully decrypt the non-cleartext information element that is security protected in the first initial NAS message. After the decryption fails, the target AMF skips an authentication procedure and sends the second indication information and the third indication information to the source AMF based on the first indication information.

In another implementation, the target AMF does not decrypt the non-cleartext information element that is security protected in the first initial NAS message; but directly skips an authentication procedure and sends the second indication information and the third indication information to the source AMF based on the first indication information. It may be understood that, because the target AMF may learn, based on the first indication information, that the second root key is received but the second root key cannot be used to decrypt the non-cleartext information element that is security protected in the first initial NAS message, the AMF is not configured to perform a procedure of decrypting the first initial NAS message by using the second root key. Therefore, time consumed for the decryption procedure is saved, and a delay for obtaining the non-cleartext information element by the target AMF is reduced.

S209: The terminal sends a second initial NAS message to the target AMF, so that the target AMF receives the second initial NAS message sent by the terminal.

Step S209 is the same as step S106. For specific descriptions, refer to step S106. Details are not described herein again.

Based on the technical solution shown in FIG. 8, the target AMF determines, based on the first indication information from the source AMF, that the first root key has been updated to the second root key. In this case, the target AMF sends the second indication information to the terminal based on the first indication information, so that the terminal can update the first root key to the second root key. This ensures that root keys stored by the target AMF and the terminal are the same. In addition, the target AMF further sends the third indication information to the terminal, to obtain the second initial NAS message sent by the terminal. Because the second initial NAS message includes the non-cleartext information element that is security protected by using the second root key, and the target AMF has obtained the second root key from the source AMF, the target AMF can decrypt the non-cleartext information element that is security protected in the second initial NAS message, to obtain the non-cleartext information element. Compared with a current technology, the target AMF does not need to initiate the authentication procedure. This helps reduce signaling overheads and saves time consumed for the authentication procedure.

In addition, when the source AMF is not trustworthy, the target AMF does not trust the non-cleartext information element sent by the source AMF, and re-obtains a non-cleartext information element from the terminal. This helps ensure the security of the network.

In the embodiments of this application, in addition to sending the second indication information and the third indication information to the terminal or sending the second indication information and the fourth indication information to the terminal, the target AMF may further send an encryption algorithm and/or integrity protection algorithm to the terminal, to ensure that the target AMF and the terminal use the same encryption algorithm and/or integrity protection algorithm.

The encryption algorithm and/or integrity protection algorithm sent by the target AMF may be carried in a NAS SMC message or other signaling. This is not specifically limited.

During specific implementation, that the target AMF sends the encryption algorithm and/or integrity protection algorithm to the terminal includes: The target AMF sends an identifier of the encryption algorithm and/or an identifier of the integrity protection algorithm to the terminal.

Optionally, the encryption algorithm sent by the target AMF may be any encryption algorithm supported by the terminal. For example, the target AMF determines, in a preconfigured encryption algorithm priority list, an encryption algorithm that has a highest priority and that is supported by the terminal, and sends, to the terminal, the encryption algorithm that has the highest priority and that is supported by the terminal. The encryption algorithm priority list is used to indicate a priority of at least one encryption algorithm.

Optionally, the integrity protection algorithm sent by the target AMF may be any integrity protection algorithm supported by the terminal. For example, the target AMF determines, in a preconfigured integrity protection algorithm priority list, an integrity protection algorithm that has a highest priority and that is supported by the terminal, and sends, to the terminal, the integrity protection algorithm that has the highest priority and that is supported by the terminal. The integrity protection algorithm priority list is used to indicate a priority of at least one integrity protection algorithm.

It may be understood that, if the target AMF does not send the encryption algorithm and/or integrity protection algorithm to the terminal, the encryption algorithm and/or integrity protection algorithm used by the terminal and the target AMF are/is pre-negotiated or are/is specified in a protocol.

The foregoing mainly describes the solutions provided in the embodiments of this application from a perspective of interaction between network elements. It may be understood that, to implement the foregoing functions, each network element such as the target mobility management network element includes a corresponding hardware structure and/or software module for performing each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that such an implementation goes beyond the scope of this application.

In the embodiments of this application, the target mobility management network element may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that in the embodiments of this application, division into the modules is an example and is merely logical function division, and may be other division during actual implementation. An example in which each function module is obtained through division based on each corresponding function is used below for description.

Figure 9:
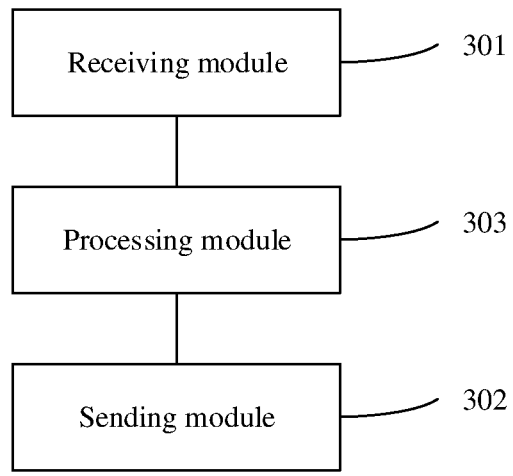
FIG. 9 is a schematic diagram of a structure of a communication apparatus according to an embodiment of this application.

FIG. 9 is a schematic diagram of a structure of a communication apparatus according to an embodiment of this application. As shown in FIG. 9, the communication apparatus includes a receiving module 301 and a sending module 302. The receiving module 301 is configured to support the communication apparatus in performing steps S101, S104, and S106 in FIG. 5, step S108 in FIG. 6, steps S201, S205, and S207 in FIG. 7, and step S209 in FIG. 8, or is configured to support another process in the technical solutions described in this specification. The sending module 302 is configured to support the communication apparatus in performing steps S102 and S105 in FIG. 5, step S107 in FIG. 6, steps S202 and S206 in FIG. 7, and step S208 in FIG. 8, or is configured to support another process in the technical solutions described in this specification.

Optionally, as shown in FIG. 9, the communication apparatus further includes a processing module 303. The processing module 303 is configured to implement the following steps: generating information (for example, second indication information or third indication information), determining whether a source AMF is trustworthy, and decrypting a non-cleartext information element that is security protected in an initial NAS message; or is configured to support another process in the technical solutions described in this specification.

In an example, with reference to the communication apparatus shown in FIG. 4, the receiving module 301 and the sending module 302 in FIG. 9 may be implemented by the communication interface 204 in FIG. 4, and the processing module 303 in FIG. 9 may be implemented by the processor 201 in FIG. 4. This is not limited in this embodiment of this application.

An embodiment of this application further provides a computer-readable storage medium. The computer-readable storage medium stores computer instructions. When the computer-readable storage medium runs on the communication apparatus shown in FIG. 4, the communication apparatus is enabled to perform the methods shown in FIG. 5 to FIG. 8. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive (SSD)), or the like.

An embodiment of this application further provides a computer program product including computer instructions. When the computer program product runs on the communication apparatus shown in FIG. 4, the communication apparatus is enabled to perform the methods shown in FIG. 5 to FIG. 8.

The communication apparatus, the computer storage medium, and the computer program product provided in the embodiments of this application are all configured to perform the methods provided above. Therefore, for beneficial effects that can be achieved thereof, refer to the beneficial effects corresponding to the methods provided above. Details are not described herein again.

Figure 10:
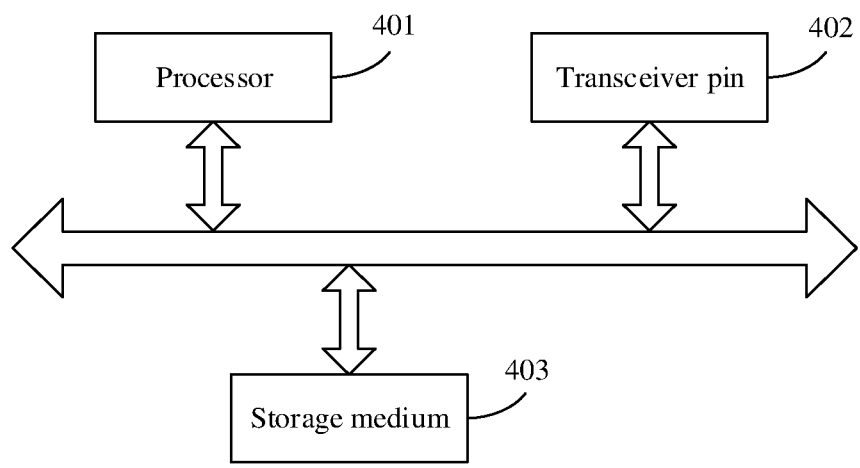
FIG. 10 is a schematic diagram of a structure of a chip according to an embodiment of this application.

FIG. 10 is a schematic diagram of a structure of a chip according to an embodiment of this application. The chip shown in FIG. 10 may be a general-purpose processor, or may be a dedicated processor. The chip includes a processor 401. The processor 401 is configured to support a communication apparatus in performing the technical solutions shown in FIG. 5 to FIG. 8.

Optionally, the chip further includes a transceiver pin 402. The transceiver pin 402 is configured to support the communication apparatus in performing the technical solutions shown in FIG. 5 to FIG. 8 under control of the processor 401.

Optionally, the chip shown in FIG. 10 may further include a storage medium 403.

It should be noted that the chip shown in FIG. 10 may be implemented by using the following circuit or component: one or more field programmable gate arrays (FPGA), a programmable logic device (PLD), a controller, a state machine, gate logic, a discrete hardware component, any other appropriate circuit, or any combination of circuits that can perform various functions described in this application.

Although this application is described with reference to the embodiments, a person skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is clear that various modifications and combinations may be made to them without departing from the spirit and scope of this application. Correspondingly, the specification and accompanying drawings are merely descriptions of examples of this application defined by the appended claims, and are considered as any of or all modifications, variations, combinations, or equivalents that cover the scope of this application. It is clear that a person skilled in the art can make various modifications and variations to this application without departing from the spirit and scope of this application. In this way, this application is intended to cover these modifications and variations of this application, provided that they fall within the scope of the claims of this application and their equivalent technologies.

What is claimed is:

1. A communication system, comprising:
   a target mobility management network element; including at least one first processor configured to: receive a first initial non-access stratum (NAS) message from a terminal, wherein the first initial NAS message comprises a first non-cleartext information element that is security protected by using a first root key, and send the first initial NAS message to a source mobility management network element; and
   the source mobility management network element including at least one second processor configured to: after performing an integrity check on the first initial NAS message, update the first root key stored by the source mobility management network element, to generate a second root key, and send first indication information and the second root key to the target mobility management network element, wherein the first indication information indicates that the second root key is obtained by updating the first root key, wherein
   the target mobility management network element is further configured to send second indication information and third indication information to the terminal based on the first indication information, wherein the second indication information indicates the terminal to update the first root key stored by the terminal to obtain the second root key, the third indication information indicates the terminal to send a second initial NAS message, the second initial NAS message comprises a second non-cleartext information element that is security protected by using the second root key, and content of the second non-cleartext information element is the same as that of the first non-cleartext information element.

2. The communication system according to claim 1, wherein the at least one first processor of the target mobility management network element is further configured to:
   receive the second initial NAS message sent by the terminal.

3. The communication system according to claim 1, wherein the sending second indication information and third indication information to the terminal based on the first indication information comprises:
   skipping an authentication procedure and sending the second indication information and the third indication information to the terminal based on the first indication information.

4. The communication system according to claim 1, wherein the second initial NAS message is comprised in a NAS security mode complete (SMP) message or a registration complete message.

5. The communication system according to claim 1, wherein the second indication information and the third indication information are comprised in a NAS security mode command (SMC) message.

6. An information obtaining method, comprising:
   sending, by a target mobility management network element to a source mobility management network element, a first initial non-access stratum (NAS) message from a terminal, wherein the first initial NAS message comprises a first non-cleartext information element that is security protected by using a first root key;
   receiving, by the target mobility management network element, a second root key and first indication information from the source mobility management network element, wherein the first indication information indicates that the second root key is a root key obtained by updating the first root key; and sending, by the target mobility management network element, second indication information and third indication information to the terminal based on the first indication information, wherein the second indication information indicates the terminal to update the first root key stored by the terminal to obtain the second root key, the third indication information indicates the terminal to send initial NAS message, the second initial NAS message comprises a second non-cleartext information element that is security protected by using the second root key, and context of the second non-cleartext information element is the same as that of the first non-cleartext information element.

7. The information obtaining method according to claim 6, further comprising:
receiving, by the target mobility management network element, the second initial NAS message sent by the terminal.

8. The information obtaining method according to claim 6, wherein after the receiving, by the target mobility management network element, a second root key and first indication information from the source mobility management network element, the method further comprises:
decrypting, by the target mobility management network element based on the second root key, the first non-cleartext information element that is security protected in the first initial NAS message; and
the sending, by the target mobility management network element, second indication information and third indication information to the terminal based on the first indication information comprises:
upon determining that the target mobility management network element fails to decrypt the first non-cleartext information element that is security protected in the first initial NAS message, skipping, by the target mobility management network element, an authentication procedure and sending the second indication information and the third indication information to the terminal based on the first indication information.

9. The information obtaining method according to claim 6, wherein the sending, by the target mobility management network element, second indication information and third indication information to the terminal based on the first indication information comprises:
skipping, by the target mobility management network element, an authentication procedure and sending the second indication information and the third indication information to the terminal based on the first indication information.

10. The information obtaining method according to claim 7, wherein the second initial NAS message is comprised in a NAS security mode complete (SMP) message or a registration complete message.

11. The information obtaining method according to claim 6, wherein
the second indication information and the third indication information are comprised in a NAS security mode command (SMC) message.

12. The information obtaining method according to claim 6, wherein the sending, by a target mobility management network element to a source mobility management network element, a first initial NAS message from a terminal comprises:
sending, by the target mobility management network element, a context request message to the source mobility management network element, wherein the context request message comprises the first initial NAS message; and
the receiving, by the target mobility management network element, a second root key and first indication information from the source mobility management network element comprises:
receiving, by the target mobility management network element, a context response message sent by the source mobility management network element, wherein the context response message comprises the second root key and the first indication information.

13. The information obtaining method according to claim 6, further comprising:
receiving, by the source mobility management network element, the first initial NAS message;
after performing an integrity check on the first initial NAS message, updating, by the source mobility management network element, the first root key stored by the source mobility management network element, to generate a second root key; and
sending, by the source mobility management network element, the first indication information and the second root key to the target mobility management network element.

14. A communication apparatus, comprising:
at least one processor coupled to at least one memory storing program instructions and configured to execute the program instructions to cause the communication apparatus to:
send, to a source mobility management network element, a first initial non-access stratum (NAS) message from a terminal, wherein the first initial NAS message comprises a first non-cleartext information element that is security protected by using a first root key;
receive a second root key and first indication information from the source mobility management network element, wherein the first indication information indicates that the second root key is a root key obtained by updating the first root key; and
send second indication information and third indication information to the terminal based on the first indication information, wherein the second indication information indicates the terminal to update the first root key stored by the terminal to obtain the second root key, the third indication information indicates the terminal to send a second initial NAS message the second initial MAS message comprises a second non-cleartext information element that is security protected by using the second root key, and content of the second non-cleartext information element is the same as that of the first non-cleartext information element.

15. The communication apparatus according to claim 14, wherein the program instructions, when executed by the at least one processor, further cause the communication apparatus to:
receive the second initial NAS message sent by the terminal.

16. The communication apparatus according to claim 14, wherein the program instructions, when executed by the at least one processor, further cause the communication apparatus to:
  decrypt, based on the second root key, the first non-cleartext information element that is security protected in the first initial NAS message; and
  upon determining that the first non-cleartext information element that is security protected in the first initial NAS message fails to be decrypted, skip an authentication procedure and send the second indication information and the third indication information to the terminal based on the first indication information.

17. The communication apparatus according to claim 14, wherein the program instructions, when executed by the at least one processor, further cause the communication apparatus to:
  skip an authentication procedure and send the second indication information and the third indication information to the terminal based on the first indication information.

18. The communication apparatus according to claim 15, wherein the second initial NAS message is comprised in a NAS security mode complete (SMP) message or a registration complete message.

19. The communication apparatus according to claim 14, wherein the second indication information and the third indication information are comprised in a NAS security mode command (SMC) message.

* * * * *

UNITED STATES PATENT AND TRADEMARK OFFICE
CERTIFICATE OF CORRECTION

PATENT NO. : 11,877,150 B2
APPLICATION NO. : 17/511680
DATED : January 16, 2024
INVENTOR(S) : Li Hu et al.

It is certified that error appears in the above-identified patent and that said Letters Patent is hereby corrected as shown below:

In the Specification

Column 17, Line 28, change "(SGMM capability) to --5GMM capability--;

In the Claims

Claim 6, Column 37, Line 12, change "send initial" to --send a second initial--;

Claim 6, Column 37, Line 15, change "context" to --content--; and

Claim 14, Column 38, Line 53, change "MAS" to --NAS--.

Signed and Sealed this
Thirteenth Day of February, 2024

Katherine Kelly Vidal
*Director of the United States Patent and Trademark Office*